United States Patent
Stoffel et al.

(10) Patent No.: US 11,281,919 B2
(45) Date of Patent: *Mar. 22, 2022

(54) OBJECT DETECTION AND PASSENGER NOTIFICATION

(71) Applicant: Zoox, Inc., Foster City, CA (US)

(72) Inventors: Christopher John Stoffel, San Carlos, CA (US); Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,013

(22) Filed: Apr. 23, 2019

(65) Prior Publication Data
US 2019/0251376 A1  Aug. 15, 2019

Related U.S. Application Data

(63) Continuation of application No. 15/486,559, filed on Apr. 13, 2017, now Pat. No. 10,303,961.

(51) Int. Cl.
*H04N 7/18* (2006.01)
*G06K 9/00* (2022.01)
(Continued)

(52) U.S. Cl.
CPC ........... *G06K 9/00832* (2013.01); *B60Q 3/76* (2017.02); *G01C 21/3407* (2013.01);
(Continued)

(58) Field of Classification Search
CPC ....... B60Q 3/76; F21V 21/30; G01C 21/3407; G01C 21/3602; G01C 21/3697;
(Continued)

(56) References Cited

U.S. PATENT DOCUMENTS 9,272,709 B2    3/2016  Ben Shalom
9,392,404 B2 *  7/2016  Daoura ............ G06K 19/07758
(Continued)

OTHER PUBLICATIONS

Murali et al, Comparative study of different CNNs for vehicle classification (Year: 2018).*
(Continued)

*Primary Examiner* — Shan E Elahi
(74) *Attorney, Agent, or Firm* — Lee & Hayes, P.C.

(57) ABSTRACT

A system for detecting a classifying objects in a vehicle can comprise one or more sensors for detecting the presence of an object, other than a passenger, on the vehicle. The system can classify the object as, for example, a personal object or trash. The system can provide a series of escalating reminders for the passenger to take the object with them when they exit the vehicle. When a personal object is left in the vehicle after the passenger has exited the vehicle, the system can communicate with a computing device of a central control or the passenger using additional communication channels such as, for example, e-mail, text, or the Internet. When trash is left in the vehicle, the vehicle can automatically contact, or return to, a maintenance facility for servicing. This can prevent the use of unclean vehicles for new passengers, among other things.

20 Claims, 12 Drawing Sheets

(51) Int. Cl.

| | | |
|---|---|---|
| G08B 21/24 | (2006.01) | |
| G08B 25/10 | (2006.01) | |
| B60Q 3/76 | (2017.01) | |
| H04W 4/44 | (2018.01) | |
| G06K 9/32 | (2006.01) | |
| H04W 4/12 | (2009.01) | |
| G01C 21/36 | (2006.01) | |
| H04W 4/02 | (2018.01) | |
| H04W 4/38 | (2018.01) | |
| G01C 21/34 | (2006.01) | |
| G06K 9/62 | (2022.01) | |
| H04L 67/12 | (2022.01) | |
| G01S 19/13 | (2010.01) | |
| F21V 21/30 | (2006.01) | |

(52) U.S. Cl.
CPC ..... *G01C 21/3602* (2013.01); *G01C 21/3697* (2013.01); *G06K 9/3241* (2013.01); *G06K 9/6267* (2013.01); *G08B 21/24* (2013.01); *G08B 25/10* (2013.01); *H04W 4/023* (2013.01); *H04W 4/12* (2013.01); *H04W 4/38* (2018.02); *H04W 4/44* (2018.02); *F21V 21/30* (2013.01); *G01S 19/13* (2013.01); *H04L 67/12* (2013.01)

(58) Field of Classification Search
CPC .. G01S 19/13; G06K 9/00832; G06K 9/3241; G06K 9/6267; G08B 21/24; G08B 25/10; H04L 67/12
USPC .......................................................... 348/148
See application file for complete search history.

(56) References Cited

U.S. PATENT DOCUMENTS

| | | | |
|---|---|---|---|
| 9,774,410 B2* | 9/2017 | Daoura | H04W 4/70 |
| 2003/0023575 A1 | 1/2003 | Shlain et al. | |
| 2009/0316988 A1 | 12/2009 | Xu et al. | |
| 2009/0322871 A1 | 12/2009 | Ji et al. | |
| 2012/0062744 A1 | 3/2012 | Schofield et al. | |
| 2014/0097957 A1* | 4/2014 | Breed | G08B 21/0407 340/576 |
| 2014/0136414 A1* | 5/2014 | Abhyanker | G06Q 10/087 705/44 |
| 2014/0267758 A1* | 9/2014 | Neff | H04N 13/243 348/164 |
| 2014/0277935 A1* | 9/2014 | Daman | B60N 2/28 701/36 |
| 2014/0297199 A1* | 10/2014 | Osten | G01N 33/5014 702/19 |
| 2014/0366113 A1* | 12/2014 | LeCun | G06F 21/32 726/7 |
| 2015/0142205 A1 | 5/2015 | Harsham et al. | |
| 2015/0202770 A1* | 7/2015 | Patron | G05D 1/024 700/245 |
| 2015/0334371 A1 | 11/2015 | Galera et al. | |
| 2015/0356393 A1* | 12/2015 | Daoura | G06Q 10/0833 340/8.1 |
| 2015/0356858 A1* | 12/2015 | Daoura | G06K 19/07758 340/539.32 |
| 2015/0356861 A1* | 12/2015 | Daoura | G08B 21/0277 340/539.13 |
| 2015/0356862 A1* | 12/2015 | Daoura | G08B 25/08 340/686.6 |
| 2015/0359127 A1* | 12/2015 | Daoura | G08B 21/24 320/101 |
| 2016/0071005 A1* | 3/2016 | Wang | G06N 3/08 706/25 |
| 2016/0162805 A1* | 6/2016 | Kwon | G06N 3/0445 706/12 |
| 2016/0182170 A1* | 6/2016 | Daoura | H04W 4/02 455/3.01 |
| 2016/0239706 A1* | 8/2016 | Dijkman | G06K 9/66 |
| 2016/0294493 A2* | 10/2016 | Daoura | H04L 67/10 |
| 2017/0013188 A1* | 1/2017 | Kothari | B60R 1/00 |
| 2017/0101111 A1* | 4/2017 | Fung | B60W 50/14 |
| 2017/0176597 A1* | 6/2017 | Gruver | G01S 17/89 |
| 2017/0291539 A1* | 10/2017 | Avery | G01S 15/04 |
| 2017/0341648 A1 | 11/2017 | Sanma et al. | |
| 2017/0370744 A1 | 12/2017 | Miyajima | |
| 2018/0227393 A1* | 8/2018 | Daub | H04L 67/22 |
| 2018/0251122 A1* | 9/2018 | Golston | B60W 50/0098 |

OTHER PUBLICATIONS

Ward et al, Multi-classification of driver intentions in yielding scenarios (Year: 2015).*

Shima, et. al., "Classifying for a Mixture of Object Images and Character Patterns by Using CNN Pre-Trained for Large-scale Object Image Dataset", IEEE, 2018, pp. 2360-2365.

* cited by examiner

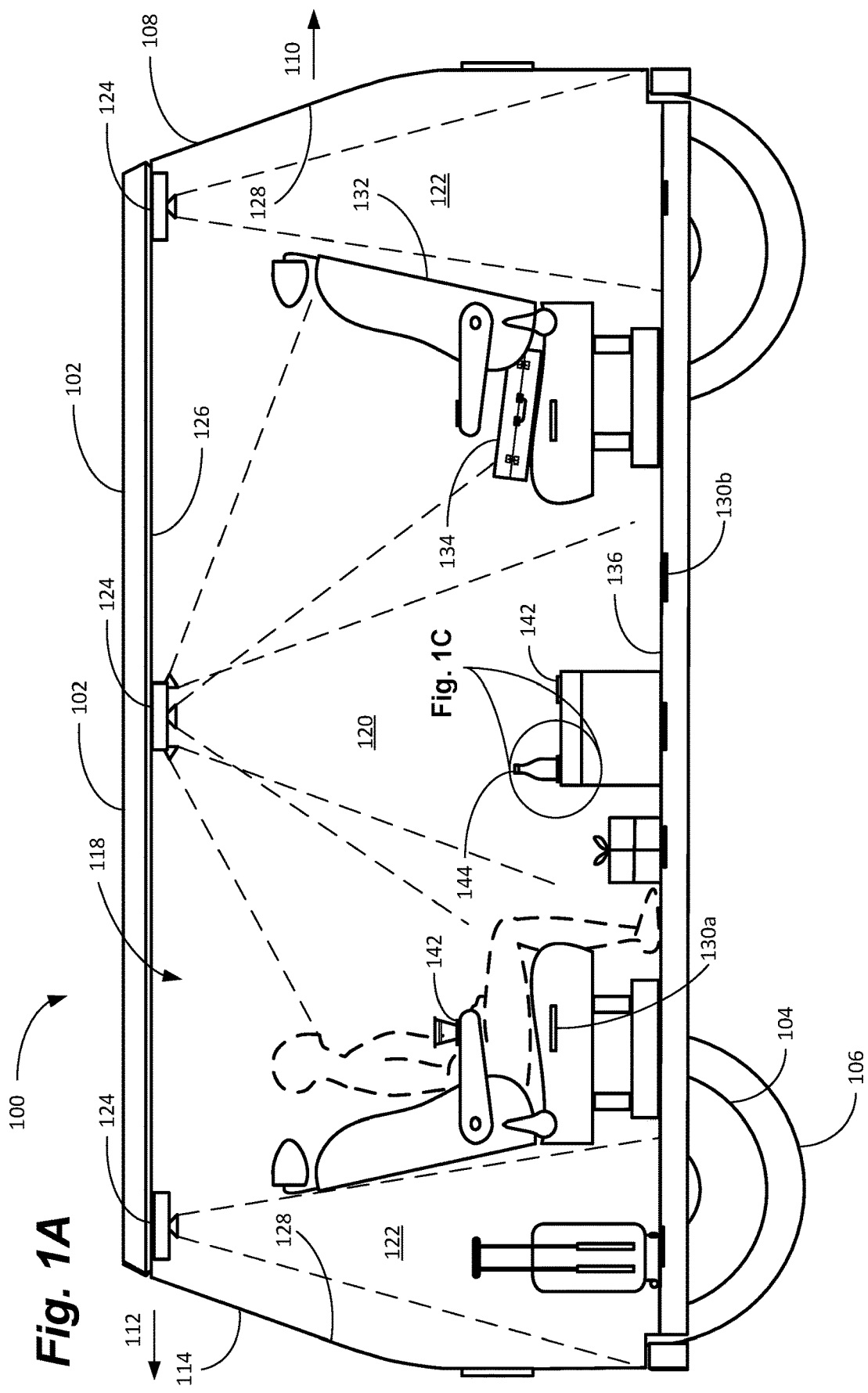

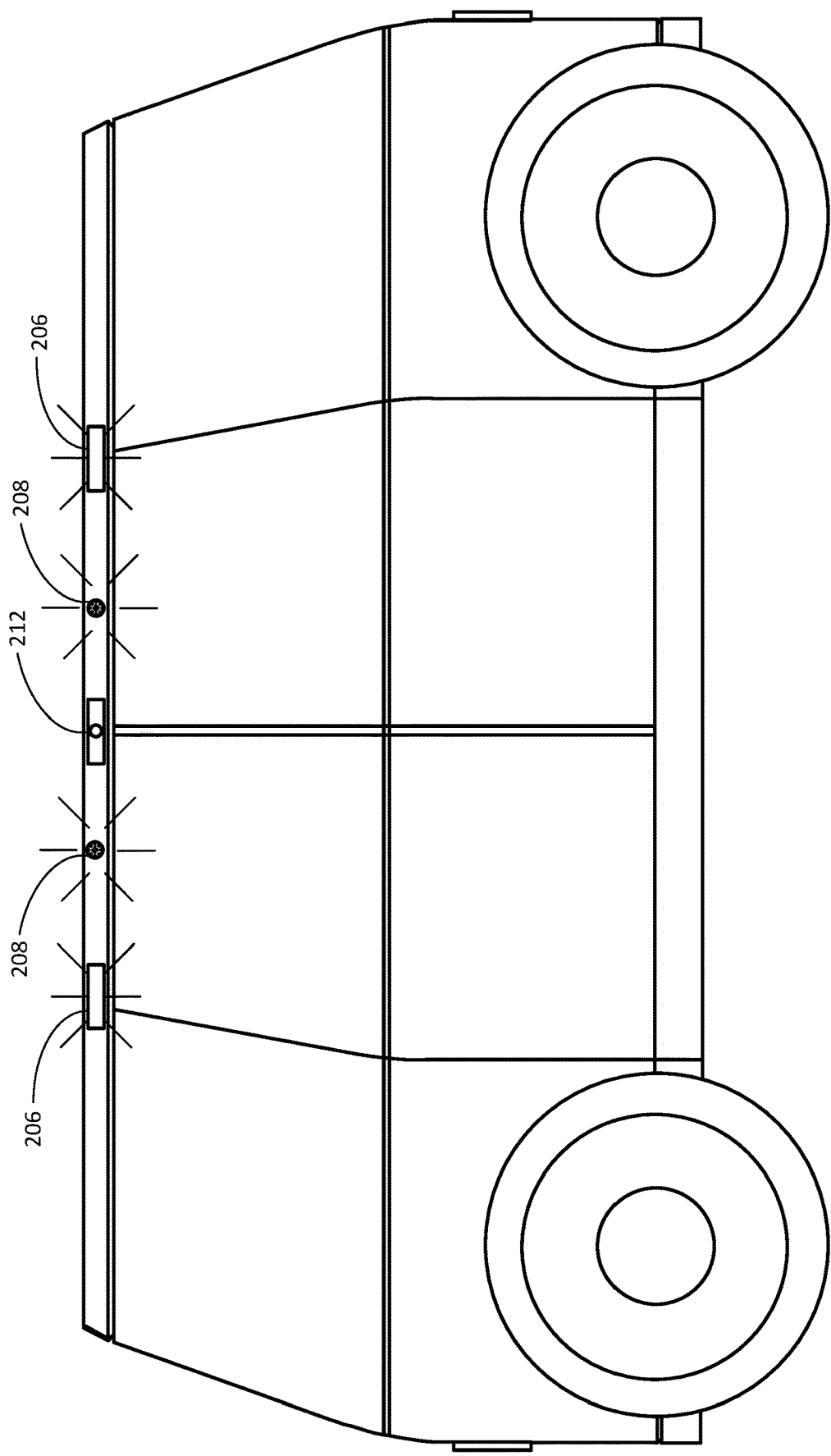

From Fig. 5B      To Fig. 5B

OBJECT DETECTION AND PASSENGER NOTIFICATION

RELATED APPLICATION

This application is a continuation of and claims priority to U.S. patent application Ser. No. 15/486,559, filed Apr. 13, 2017, entitled "Object Detection and Passenger Notification," the entirety of which is incorporated by reference herein.

BACKGROUND

Fully autonomous vehicles can act as taxies, delivery vehicles, and passenger vehicles, among other things. Autonomous vehicles may be reserved using an online application or "app," for example, and deliver people or cargo from one place to another. Like non-autonomous vehicles, autonomous vehicles can include seats, tray tables, cupholders, pockets, cubbies, and other facilities to enable passengers to use and stow personal items in transit. Thus a passenger may place a backpack on the seat next to them, for example, while they use a laptop on a tray table.

When traveling in an autonomous vehicle, or indeed any vehicle, however, there is a risk that items may be left behind at the end of a journey. On a rainy day, for example, people may leave their umbrella in the car, especially if the weather has cleared up. People may place a briefcase or backpack on the seat next to them and then leave it behind due to a distraction (e.g., an incoming call or text). Indeed, whether a vehicle is autonomously, semi-autonomously, or manually controlled, the risk of leaving items in the vehicle exists.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 1A is a side cutaway view of an example of a vehicle including an illustrative interior sensor array, in accordance with some examples of the present disclosure.

FIG. 2C is a side view of the vehicle of FIG. 2A depicting one or more external devices for providing notifications to passengers, in accordance with some examples of the present disclosure.

DETAILED DESCRIPTION

Figure 1B:
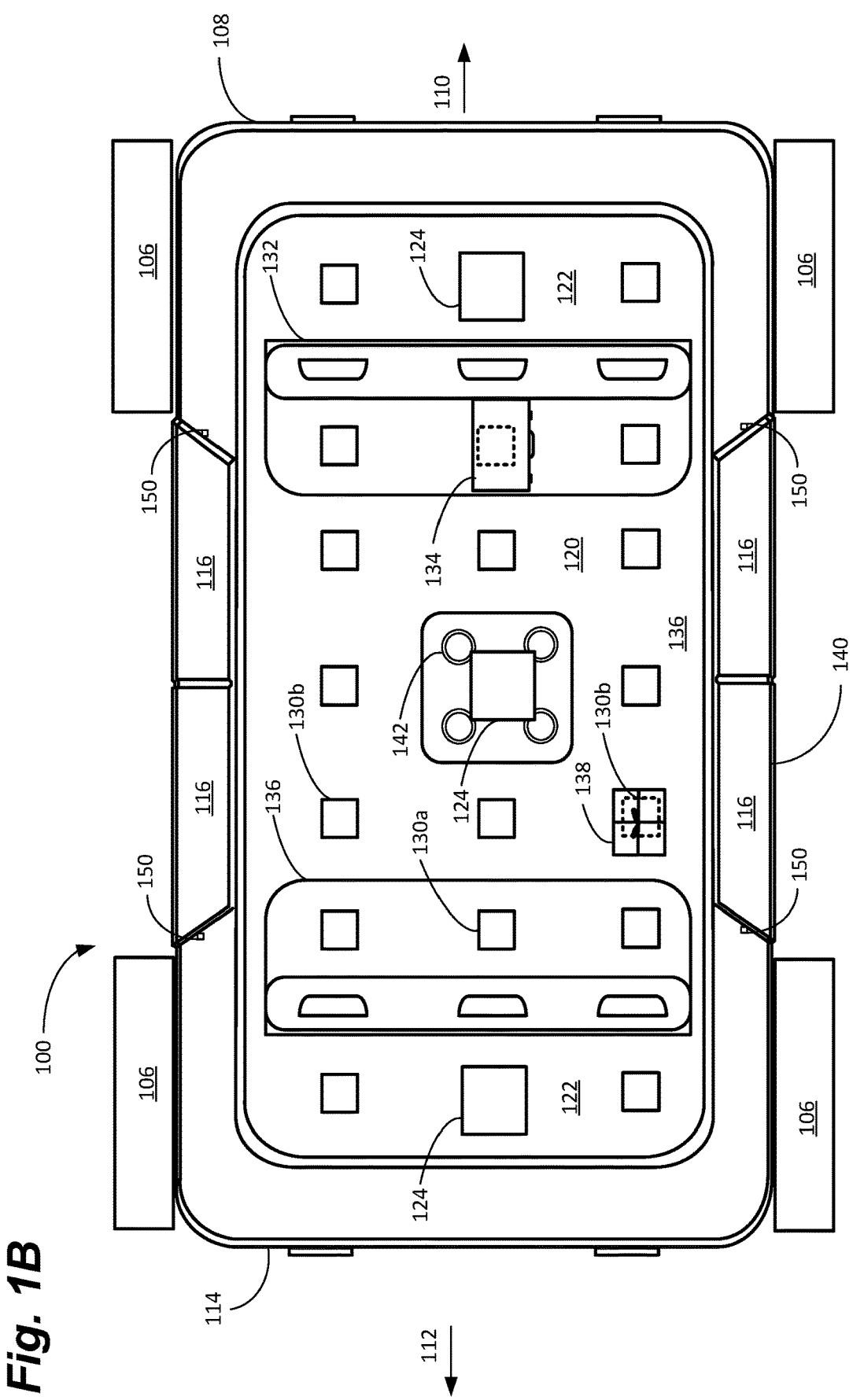
FIG. 1B is a top cutaway view of the vehicle of FIG. 1A, in accordance with some examples of the present disclosure.

As discussed above, autonomous vehicles can fill a number of roles currently occupied by human drivers. Autonomous vehicles can be used, for example, to transport passengers and cargo between various locations (e.g., from a hotel to the airport). Regardless of their destination, passengers often have personal items, such as, for example, cell phones, briefcases, and computers, which can potentially be left in the vehicle at the end of a journey, when the passenger exits the vehicle. Similarly, when carrying cargo, it is possible that a portion of the cargo will be overlooked and left behind. A box that has fallen onto the floor of the vehicle, for example, may be obscured by the seat and overlooked. The risk of leaving an item behind is not limited to autonomous vehicles and may apply to semi-autonomous and manual (i.e., operated by a human) vehicles as well.

To this end, examples of the present disclosure can comprise a system for detecting and/or classifying objects in autonomous, semi-autonomous, or manual vehicles, and notifying users when necessary. In transit, the vehicle can detect the presence of an object in, for example, the vehicle's cup holder, on the seat, or on the floor. As the vehicle approaches the user's destination, the vehicle can provide audio, visual, and/or tactile reminders inside the vehicle to retrieve the item. As the doors open at the destination, these reminders may move to outside the vehicle, escalate in frequency or volume, and/or change in some other way in an effort to further gain the user's attention. Finally, if the user still fails to retrieve the item, the vehicle may contact the user, a central control, or law enforcement, among other things.

In some examples, the vehicle can include one or more sensors inside the vehicle to detect and classify objects. In some examples, the system may include, for example, one or more cameras and computer vision software. The system can additionally or alternatively include weight sensors, pressure sensors, light beams, moisture sensors, visions systems, and other sensors to detect the presence of objects. If a user places a drink in the cup holder of the vehicle, for example, this can be detected using a combination of sensors such as, for example, a weight sensor, a moisture sensor, and a vision system. The weight sensor may detect an object that weighs several ounces (e.g., a 16 ounce drink), while the vision system can identify a curved form with a translucent body and an opaque cap. Additionally, or in the alternative, various machine learning algorithms may be used to detect, recognize, and or classify objects. The system may even include a moisture sensor to detect the condensation on the bottle. Based on this data and the object's location in a cupholder, for example, the system can classify the object as a drink. As the vehicle approaches its destination, therefore, the system can activate a light and/or play a message, "Your destination is just ahead, don't forget your drink!"

This disclosure is described below as it relates to systems and methods for determining whether personal belongings, cargo, trash, or other items are inside an autonomous vehicle and providing appropriate reminders or alerts based on that determination. In some examples, the system may also be used in semi-autonomous or manual vehicles as well. Indeed, cab and bus drivers rarely have the time or inclination to scan the passenger area of a taxi or bus, respectively, to prevent items from being left behind. Thus, the techniques described herein may be used to remind passengers not leave an item behind and/or to notify passengers that they have left an item behind.

In some examples, as discussed below, these systems and methods can also include a classification system to distinguish between personal items (e.g., a purse or cell phone), trash, and other items to provide notifications based on the classification. The systems and methods described herein may be incorporated into conventional vehicles (e.g., taxies and buses) and into partially or fully autonomous vehicles (i.e., vehicles that require limited or no driver control or attention). In some examples, users may provide an acknowledgement to deactivate the system once the item is retrieved, or the system may detect that that user has retrieved the item.

As discussed above, the vehicle may include a variety of sensors such as, for example, imagers (e.g., cameras), weight sensors, pressure sensors, radio detection and ranging (RADAR), light detection and ranging (LIDAR), wireless (e.g., WiFi and Bluetooth®) sensors and other sensors configured to detect objects inside the vehicle. The system can also include a classification module which may provide correlations between the data from the various sensors in an attempt to classify the object. Thus, a weight sensor may detect the weight of an object in the vehicle's cup holder and the camera may detect the shape of the object. Based on the shaped (e.g., rectangular) and the weight (several ounces), therefore, the system can determine that the object is a cell phone, for example, and not a purse. Additionally, or in the alternative, such a vision system may use any number of computer vision algorithms to determine what an object is. For example, deep learning may be used to perform object recognition and classification.

Some examples of the systems and methods may include and/or use a reporting module in communication with a network. The reporting module may be configured to communicate with a computing device of a central control or central office, maintenance service, or law enforcement. In some examples, the entity to be notified and/or the action to be taken may depend on the classification of the object. If the object is determined to be a personal object (e.g., a wallet or computer), for example, the vehicle can contact a central control to attempt to contact the user using additional channels of communication (e.g., by phone, text, or e-mail), or may attempt to return the item to the user. If the object is determined to be trash, on the other hand, the vehicle may contact a maintenance service, or simply return to a maintenance facility for service.

The techniques and systems described herein may be implemented in a number of ways. Example implementations are provided below with reference to the following figures.

FIGS. 1A-2C show an example of an automated vehicle system 100 configured to transport people and/or cargo from a first location to a second location. For the purpose of illustration, the system 100 can comprise a vehicle 102, which may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. As mentioned above, however, this is merely an example, and the systems and methods described herein may be incorporated into any vehicle, including those ranging from vehicles that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions. Also, while described in the context of a ground vehicle, the techniques described herein are also applicable to other vehicles, such as aircraft and watercraft.

Figure 1C:
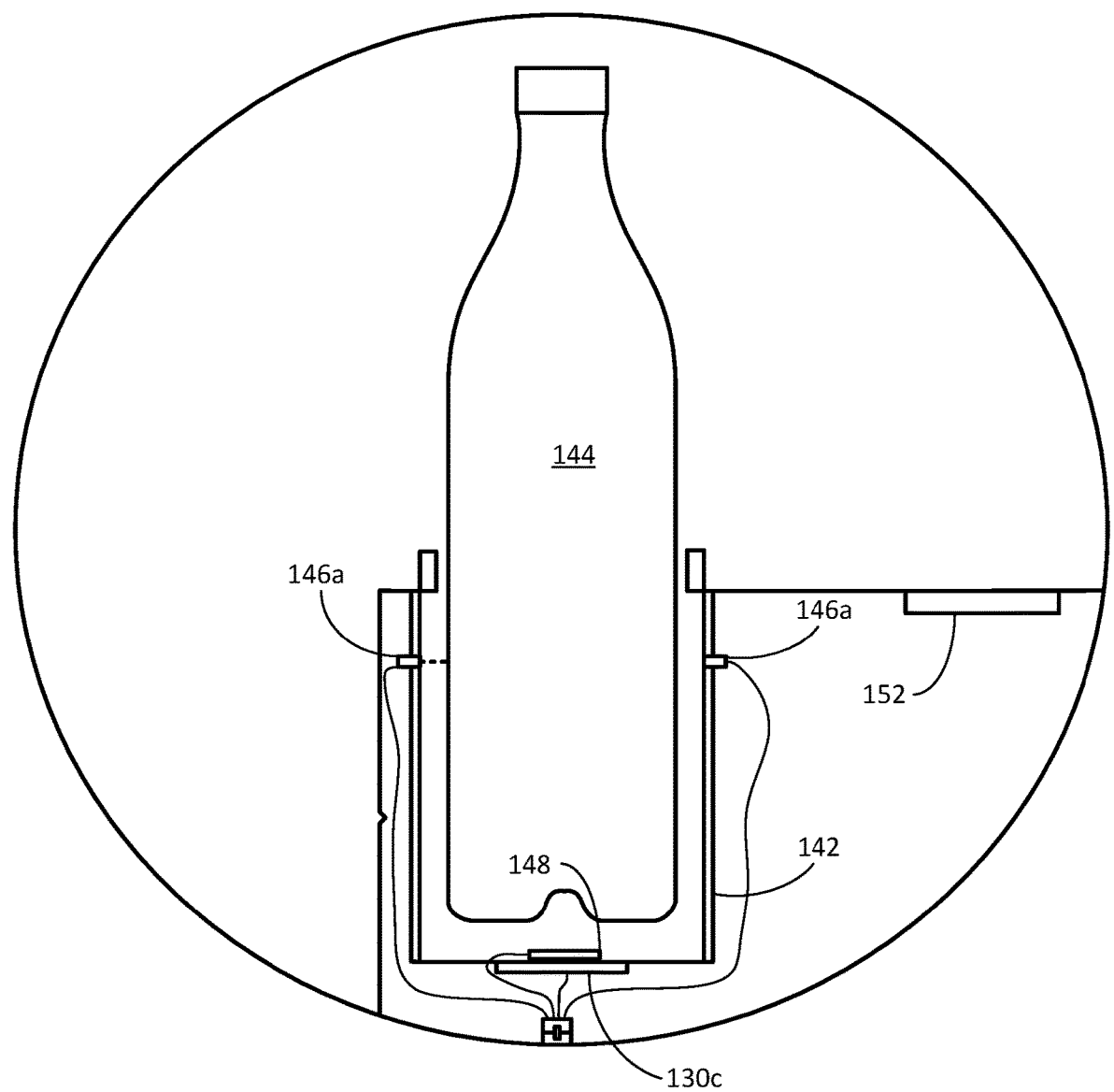
FIG. 1C is a detailed view of a cupholder with various sensors, in accordance with some examples of the present disclosure.

FIGS. 1A-1C depict the interior sensors of the system 100 The example vehicle 102 shown in FIGS. 1A (side view) and 1B (top view) is an automobile having four wheels 104 and respective tires 106 for each of the wheels 104. Other types and configurations of vehicles are contemplated, such as, for example, vans, sport utility vehicles, crossover vehicles, trucks, buses, agricultural vehicles, and construction vehicles, as well as aircraft and watercraft. The vehicle 102 may be powered by one or more internal combustion engines, one or more batteries and electric motors, hydrogen fuel cells, or any combination thereof. In addition, although the example vehicle 102 has four wheels, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end 108 of the vehicle 102 is the front end of the vehicle 102 when traveling in a first direction 110, and such that the first end 108 becomes the rear end of the vehicle 102 when traveling in the opposite, second direction 112, as shown in FIGS. 1A and 1B. Similarly, a second end 114 of the vehicle 102 is the front end of the vehicle 102 when traveling in the second direction 112, and such that the second end 114 becomes the rear end of the vehicle 102 when traveling in the opposite, first direction 110. These example characteristics may facilitate greater maneuverability, for example, in small spaces or crowded environments, such as parking lots and urban areas.

The example vehicle 102 shown in FIGS. 1A-2C includes one or more doors 116 on each side of the vehicle 102 for facilitating entry and exit of occupants and cargo to and from an interior space 118 of the vehicle 102. The systems and methods described herein may be incorporated into vehicles having fewer or a greater number of doors. Because the vehicle 102 is autonomous, the vehicle 102 may have no need of a dash board, steering wheel, or other trappings of conventional vehicles. To this end, in some examples, the vehicle 102 can include a passenger area 120 and two cargo areas 122, one at the first end 108 and one at the second end 114 of the vehicle 102.

In some examples, as shown in FIGS. 1A-1C, the vehicle 102 can comprise a plurality of interior sensors to detect objects and passengers in the interior space 118 of the vehicle 102. To this end, in some examples, the system 100 can comprise one or more interior imagers 124. The interior imagers 124 can be disposed on the ceiling 126 or walls 128 of the interior space 118. Each imager can include a field of view covering a portion of the interior space 118 of the vehicle 102. As shown, in some examples, the system 100 can include an interior imager 124 covering each cargo area 122, for example, and an interior imager 124 covering the passenger area 120. Of course, more or less interior imagers 124 could be used. An interior imager 124 with a wide viewing angle, for instance, may be able to view the entire interior space 118. Vehicles 102 with additional interior components (e.g., more seats, benches, tables, etc.) may warrant more than three interior imagers 124 to provide full coverage.

The interior imagers 124 can comprise still cameras, depth cameras, RGB cameras, RGB-D cameras, intensity cameras, video cameras, RADAR or LIDAR sensors, proximity sensors, and/or other sensors capable of detecting objects in the interior space 118. In some examples, the interior imagers 124 can include high-definition video cameras, infrared or night vision cameras, or a combination thereof. The interior imagers 124 can be used, in concert with additional sensors and an object classification system, discussed below, to identify, locate, and/or classify objects on the interior space 118 of the vehicle 102.

In some examples, the system 100 can also include one or more weight sensors 130 distributed throughout the interior space 118 of the vehicle 102. In some examples, the seats 132 can comprise one or more seat weight sensors 130*a* disposed in various locations. In the case of a bench seat 132 (shown), the system 100 can comprise a seat weight sensor 130*a* disposed in the left 132*a*, middle 132*b*, and right 132*c* seat locations. The weight sensors 130 can provide both weight and location data to the system 100. So, for example, if a briefcase 134 is placed on middle 132*b* of the seat 132, the seat weight sensor 130*a* in the middle 132*b* of the seat 132 provides not only the weight of the briefcase 134 (e.g., several pounds), but the location (e.g., the middle seat). The system 100 can use this information both to classify and locate the briefcase 134 in the vehicle 102.

In some examples, the system can also include one or more floor weight sensors 130*b*. Like the seat weight sensors 130*a*, the floor weight sensors 130*b* can be disposed throughout the interior space 118 under the floor 136 or the floor covering (e.g., carpet). In a similar manner, the floor weight sensors 130*b* can provide information related to the weight and location of objects in the interior space 118 of the vehicle. To this end, if a passenger places a package 138 on the floor 136 near the right side 140 of the vehicle, for example, the floor weight sensor 130*b* in that location can provide not only the weight of the package 138, but the approximate location. This may be useful to customize reminder messages prior to the passenger leaving the vehicle 102, as discussed below.

In some examples, the vehicle 102 can also include a plurality of cup holders 142, or other compartments, to hold beverages and other items. To this end, as shown in FIG. 1C, in some examples, the system 100 can also include one or more sensors proximate the cup holders 142. In some examples, the system 100 can include one or more cup holder weight sensors 130*c*. As before, the cup holder weight sensors 130*c* can provide information related to which cup holders 142 contain objects and how much the objects weigh. As discussed below, this can enable the system 100 to distinguish between a drink 144 (shown) in the cup holder 142, for example, and a cell phone or other item.

In some examples, the cup holder 142 can also include one or more beam sensors 146. The beam sensors 146 can comprise, for example, a light source 146*a* (e.g., visible, laser, or infrared light) and a receiver 146*b*. When an object is placed in the cup holder 142, therefore, the object breaks the beam, interrupting the signal from the beam sensor 146. This can provide a simple and robust means of detecting objects in the cup holder 142 (or in other areas of the interior space 118).

In some examples, the beam sensor 146 can also provide some data regarding the size of the object in the cup holder 142. In other words, of the cup holder weight sensor 130*c* detects an object in the cup holder 142, but the beam sensor 146 remains uninterrupted, then the object is likely relatively small compared to the cup holder 142. This information, along with other sensor data, can be used by the object classification system 300 to classify the object.

In some examples, the cup holder 142 can also include a moisture sensor 148. As the name implies, the moisture sensor 148 can detect the presence of moisture, which can further enable the object classification system 300 to classify the object. In other words, the presence of moisture on the object indicates it is likely cold. As such, the object is likely to be a drink 144 as opposed to a cell phone or other object. This information, along with other sensor data, can be used by the object classification system 300 to classify the object as a drink 144, which may affect the type of notification provided by the system 100.

In some examples, the system 100 can also comprise a network sensor 152. The network sensor 152 can detect the presence of a Wi-Fi, Bluetooth®, or cellular device, for example, to provide additional input to the system 100. The network sensor 152 can detect detecting the presence of a wireless transceiver in the device, for example, to enable the system 100 to identify cellphones, laptops, and other devices and to distinguish them from other items, such as drinks or packages, for example. In some examples, the network sensor 152 can merely detect the presence of network enabled devices to ensure they are not left behind. In other examples, the network sensor 152 can enable the system 100 to connect to user devices to provide updates (e.g., ETAs), receive data (e.g., user profiles), and perform other functions. In some examples, the system 100 can provide reminders directly to the user's network connected devices via the network sensor 152. The network sensor 152 is shown in a center console of the vehicle 102, but could be located in other places (e.g., on the walls 128 or ceiling 126, or in the floor 136) in the vehicle 102.

Of course, while described above as a cup holder 142, the vehicle 102 could also include other compartments that include one or more sensors. The vehicle 102 could include a glove box, cubbies, shelves, and other areas where passengers can stow items in transit. As such, each of these compartments can include one or more of the above-mentioned sensors (e.g., sensors 130*c*, 146, 148) to detect and/or classify objects in the vehicle 102.

Figure 2A:
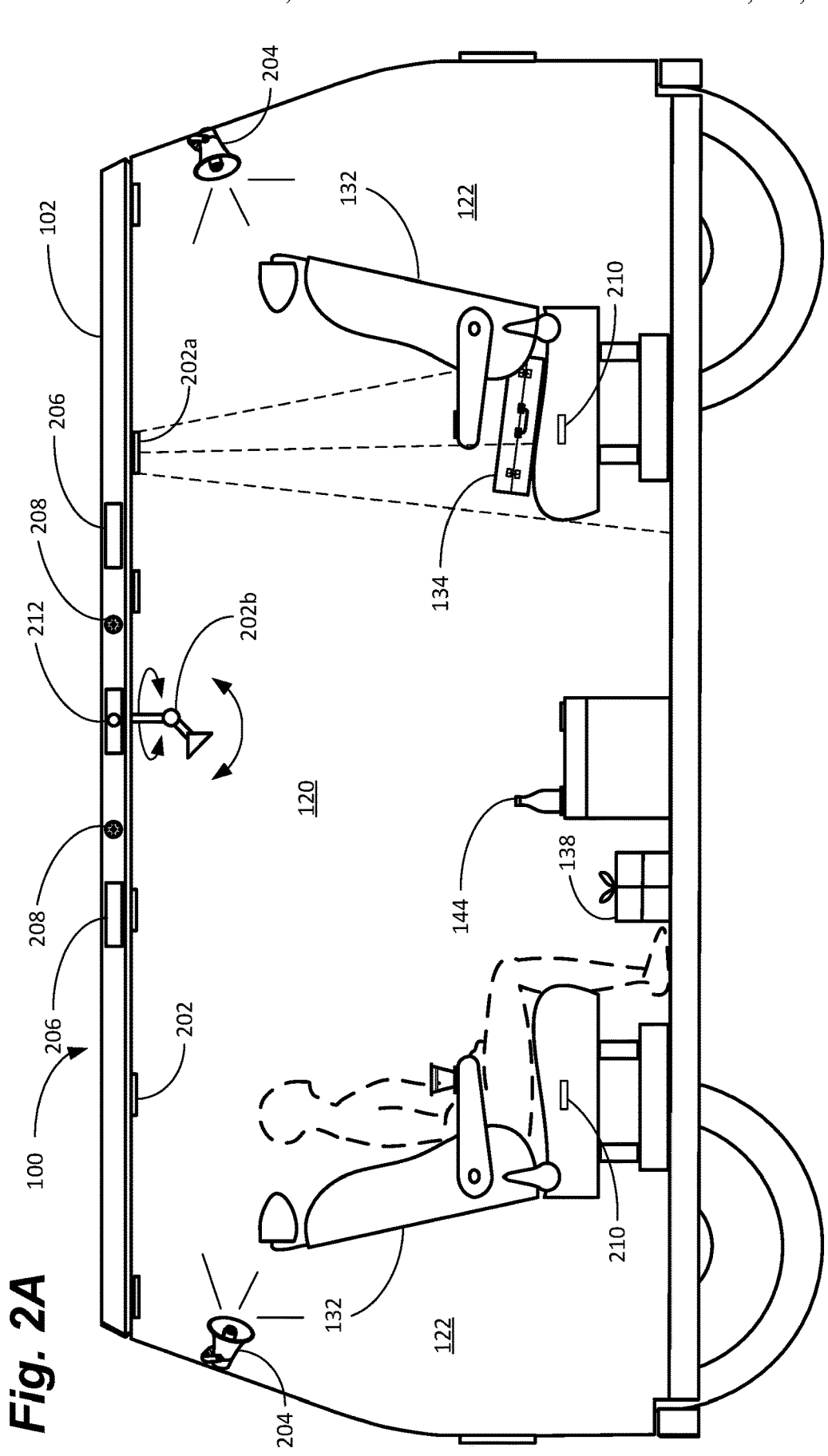
FIG. 2A is a side cutaway view of an example of a vehicle including one or more devices for providing notifications to passengers, in accordance with some examples of the present disclosure.
Figure 2B:
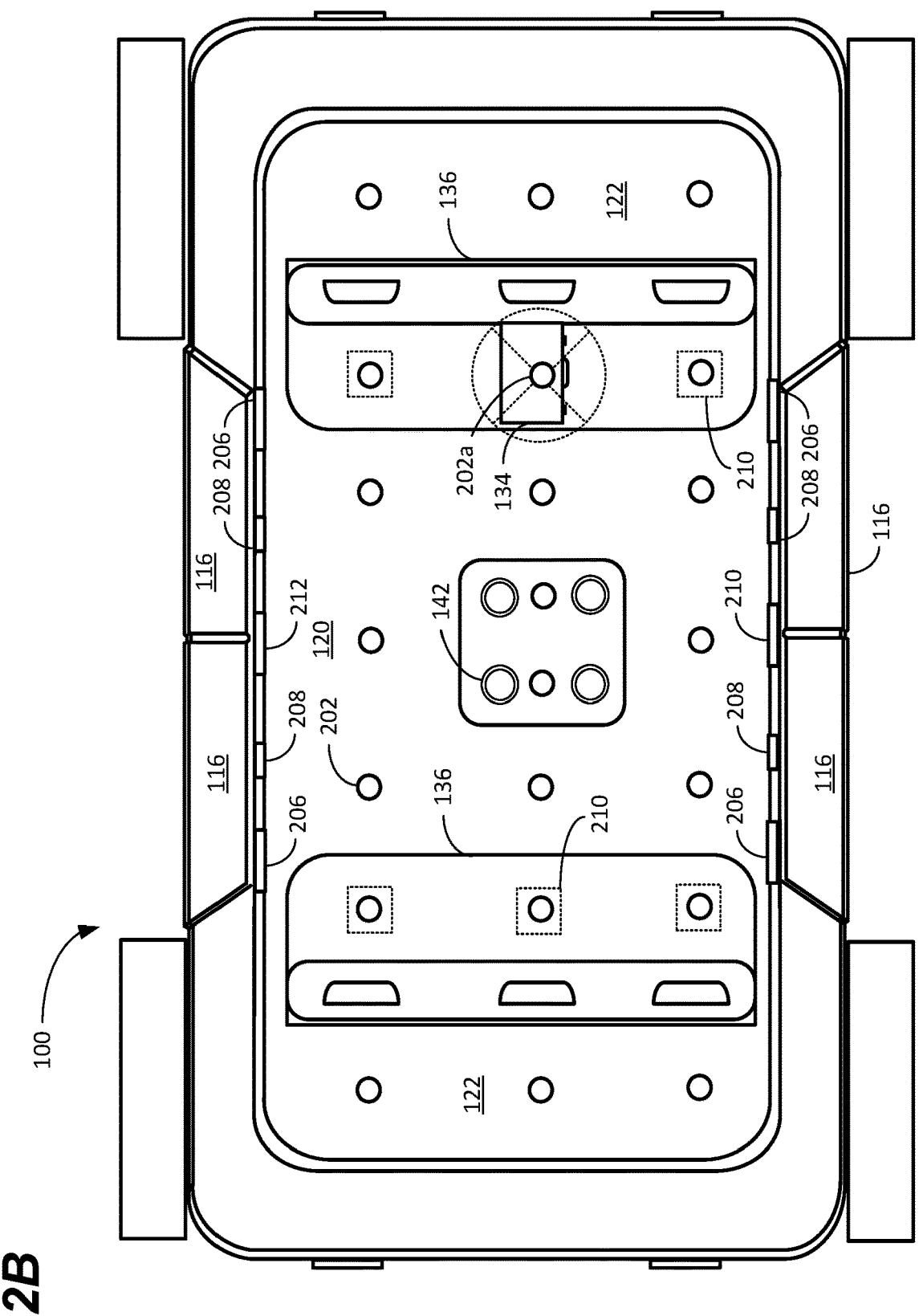
FIG. 2B is a top cutaway view of the vehicle of FIG. 2A, in accordance with some examples of the present disclosure.

As shown in FIGS. 2A-2C, in addition to a number of sensors for detecting objects, the system 100 can also comprise a number of components for alerting passengers not to forget these objects. The system 100 can include, for example, one or more interior lights 202, one or more interior audio devices (e.g., interior speakers 204), one or more exterior lights 206, and one or more exterior audio devices (e.g., exterior speakers 208). As discussed above, the system 100 can provide reminders to passengers to reduce the incidence of items being left on the car. To this end, in some examples, as the vehicle 102 approaches the passenger's destination, the system 100 can provide audio, tactile, and/or visual reminders.

As shown in FIGS. 2A and 2B, in some examples, the system 100 can include a plurality of interior lights 202 located over various locations in the interior space 118 to alert passengers to items. Thus, if a passenger leaves a briefcase 134 on the seat 132 of the vehicle 102, a specific light 202*a* above that location in the vehicle 102 can be activated to remind the passenger to retrieve the briefcase 134. As discussed above, the location of the briefcase 134 can be determined in part by the location of the seat weight sensor 130*a* below the briefcase 134. In addition, the interior imagers 124 may also provide location information using triangulation, parallax, or other methods.

In some examples, the system 100 can also provide audio reminders via the one or more interior speakers 204. In some examples, this may be a generic reminder such as, for example a tone, bell, or buzzer. In other examples, the interior speakers 204 may provide a generic message such as, for example, "Please remember your items." In other examples, the interior speakers 204 may provide a more specific message including the location and/or classification of the object. In this case, the message can include a classification provided by the object classification system 300 (e.g., a briefcase or luggage) and a location provided by a seat weight sensor 130a, among other things. Thus, the interior speakers 204 may provide a specific message such as, for example, "Please remember your briefcase on the opposite seat."

In some examples, the seat 132 may also include tactile, or haptic, feedback. In some examples, the seat 132 may further include a tactile feedback mechanism 210 (e.g., a vibration generator or force feedback). The tactile feedback mechanism 210 can include a vibration generator, for example, including a motor turning a flywheel with a deliberate imbalance, for example. In this manner, when the motor spins, the imbalance in the flywheel causes a vibration. Thus, if a passenger has one or more items in the interior space 118 of the vehicle 102, the system 100 may provide haptic feedback in additional to, or instead of, visual and/or audio feedback.

In some examples, as discussed below with reference to FIGS. 5A-5D, the reminder message can escalate as the vehicle 102 draws nearer to the destination, as the doors 116 open, and/or as the passenger exits the vehicle 102. In some examples, the frequency or volume of the messages may increase. In other examples, the reminders may include more types of feedback. In other words, at a first predetermined time (e.g., 1 or 2 minutes) from the destination, the system 100 can provide an audio-only reminder over the speakers—e.g., "Please remember to take your items with you." As the destination approaches, if the system 100 detects that the items are still in the original location (e.g., on the floor 136 or in the seat 132 rather than in the passenger's hand), the system 100 can activate a specific light 202a to illuminate the object and/or provide a more specific and/or louder message—e.g., "Please remember to retrieve your briefcase of the seat prior to exiting the vehicle." If the doors 116 open and the system 100 determines the passenger has still not retrieved the object, the system 100 may introduce a siren, bell, or other more intrusive noise, flash the specific light 202a or all the interior lights 202, or take other steps to try to gain the passenger's attention.

In some examples, rather than using multiple lights 202 and then illuminating a specific light 202a as part of a reminder, the vehicle 102 can include an articulating spotlight 202b. As shown, the articulating spotlight 202b can rotate and/or pivot to enable the articulating spotlight 202b to be aimed at many locations in the interior space 118 of the vehicle 102. Thus, depending on the configuration, the system 100 may include one articulating spotlight 202b in the passenger area 120 and one articulating spotlight 202b in each cargo area 122, for example, which can provide coverage for substantially the entire interior space 118 of the vehicle 102. The articulating spotlight 202b can be aimed using location data derived by the system 100 from the various sensors (e.g., the interior imager 124 and weights sensors 130), as discussed above.

In some examples, as the destination approaches, for example, if the system 100 detects that the items are still in the original location (e.g., on the floor 136 or in the seat 132 rather than in the passenger's hand), the system 100 can maneuver the articulating spotlight 202b towards the object and then activate the articulating spotlight 202b to specifically illuminate the object. This may reduce the number of interior lights 202 required to illuminate the interior space 118 of the vehicle. Such configurations may be pre-programmed and stored in a database so that various orientations of the light may be quickly determined.

In some examples, the passenger may be involved on an important call or otherwise be distracted and may exit the vehicle 102 despite the escalating reminders to retrieve the object. To this end, in some examples, the system 100 may determine that the passenger has exited the vehicle 102, yet the object remains in the interior space 118. Thus, the system 100 may detect that the object is in the interior space 118 of the vehicle 102 using one or more of the interior imagers 124, but the passenger is outside the vehicle 102. In some examples, the system 100 can also include one or more exterior imagers 212, or other sensors, for this purpose. The external imagers 212 can include facial recognition, object tracking, or machine learning, for example, to confirm that the passenger has left the vehicle, to ensure the correct person is notified, and/or to provide exterior messages at the appropriate volume (e.g., based on the passenger's distance from the vehicle).

In this case, the system 100 can then activate one or more exterior lights 206 and/or exterior speakers 208. In some examples, the exterior lights 206 can be strobe lights, for example, to alert the passenger to the forgotten item. In some examples, the exterior speakers 208 can provide progressively louder and more urgent messages such as, for example, "PLEASE RETURN TO THE VEHICLE, YOU HAVE LEFT ITEMS BEHIND!" In some examples, both the interior lights 202 and exterior lights 206 can be turned on, flashed, or otherwise activated to try to gain the passenger's attention.

Figure 3:
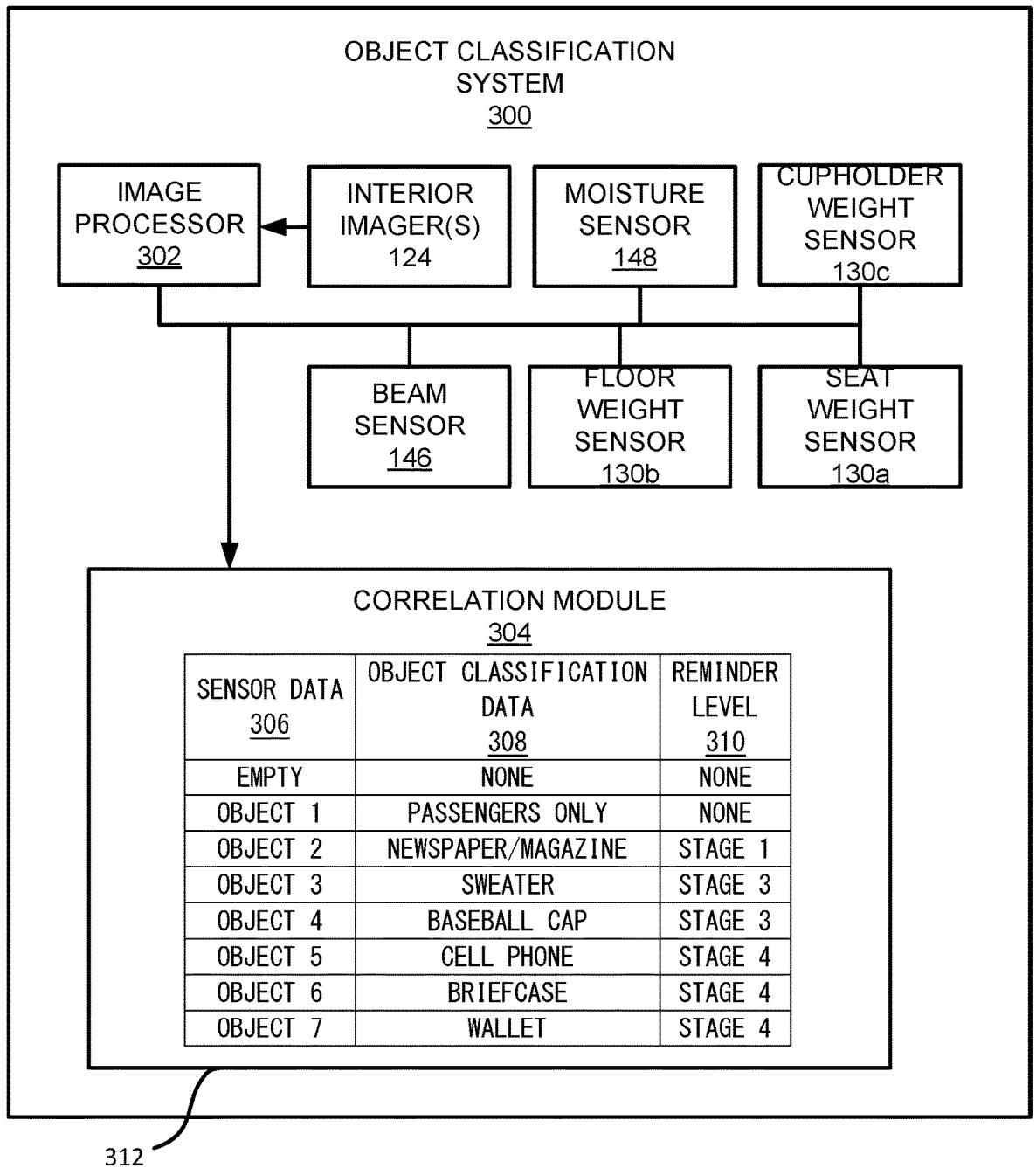
FIG. 3 is a block diagram of an illustrative object classification system, in accordance with some examples of the present disclosure.

FIG. 3 is a block diagram of an example of an object classification system 300 that may be used in connection with a vehicle such as vehicle 102. In some examples, the object classification system 300 may be communicatively coupled with the system 100 and a vehicle notification system 406, discussed below with reference to FIG. 4. In the illustrated example, the object classification system 300 can include an image processor 302. In some examples, the object classification system may include one or more interior sensors (e.g., interior imagers 124, weight sensors 130, beam sensors 146, moisture sensors 148, door sensors 150, and/or network sensors 152). Additionally, or alternatively, the object classification system 300 may communicate with one or more interior sensors of other systems of the vehicle. As shown, the object classification system 300 can also comprise a correlation module 304, which can include sensor data 306 correlated to a plurality of object classification data 308, and an associated reminder level 310. As mentioned above, the reminders provided can be adjusted based in part on the value—intrinsic or otherwise—of the object. So, a newspaper or soda may receive a lower reminder level, for example, than a purse or laptop.

In some examples, the object classification system 300 can include the interior imager(s) 124 configured to capture image data associated with the interior space 118 of the vehicle 102. The example object classification system 300 may also include an image processor 302 in communication with the interior imager(s) 124. The image processor 302 may be configured to receive the image data from the interior imager(s) 124 and determine object classification data 308 associated with the interior space 118 of the vehicle 102, at least in part, on the image data. In some examples, the image processor 302 can include image recognition software, for example, to enable the object classification system 300 to distinguish between objects and passengers, among other things. Thus, if only a passenger is present in the vehicle 102, no reminders are needed at the end of the journey.

In some examples, image data can be processed by the image processor 302. This image data can be analyzed according to one or more machine learning procedures, such as, for example, a convolutional neural network (CNN), a support vector machine (SVM), a random decision forest regression analysis, and/or any other suitable regression analysis. Such analysis may include, for example, object detection, recognition, segmentation, classification, and the like. The interior imager(s) 124 may be, for example, a plenoptic multi-camera system focused on a relatively small portion of the interior space 118 of the vehicle 102 and configured to obtain an image shape or depth profile by defocusing the one or more of the interior imager(s) 124. In some examples, the image depth profile may be enhanced using multi-views from the interior imager(s) 124, which may provide overlapping image data.

Regarding analysis of the image data, in some examples, the one or more machine learning procedures may be configured to be trained by inputting known image data, and in some examples, other known parameters, along with known object-related data corresponding to the known image data and parameters. Based on this training, the machine learning procedures may receive image data and other known parameters, and the image processor 302 may correlate or determine the object classification data 308 corresponding to the image data and other sensor data 306.

For example, to the extent the image data and/or parameters is/are different than those input for training, the machine learning procedures may determine the object classification data 308 by taking one or more of those differences into account when analyzing the current image data. Examples of other parameters include, but are not limited to, any data associated with the vehicle 102, such as, for example, data from the weight sensor(s) 130, moisture sensor(s) 148, and/or beam sensor(s) 146 indicating the location and/or weight of the object in the seat 132, for example.

If the seat weight sensor 130a indicates that the object weights 12 lbs. and the image processor 302 identifies the object as rectangular and 2 feet×3 feet, for example, the object is likely not a cell phone, but a briefcase 134 or similar. If, on the other hand the cup holder weight sensor 130c indicates that an object in the cup holder 142 weighs a couple of ounces, the image processor 302 indicates the object is rectangular and 3"×4", and the moisture sensor 148 detects little or no moisture, the object is likely a cell phone and not a drink 144.

In some examples, the image processor 302 may use the above-noted image depth profile and machine learning procedures to analyze the image data and determine characteristics related to the object. These characteristics may be used to identify one or more material characteristics of the object, such as, for example, the type of material, the surface characteristics of the material (e.g., characteristics such as smooth or abrasive), and/or whether the shape of the cargo is geometric or organic, among other things. The image processor 302 in some examples may use feature extraction techniques to identify lines, edges, ridges, textures, and shapes in the image data to distinguish between a box, for example, and a dog.

In some examples, the image data may be pre-processed to, for example, re-sample it, reduce noise in the data, and/or enhance the contrast in the image data. In some examples, the image processor 302 may use one or more of the following techniques to analyze the image data: point of interest selection, segmentation, image recognition, and image registration. In some examples, multi-view stereo techniques may be used to acquire and analyze the image data. In some examples, the amount of data associated with the image data may be increased by perturbing the image data.

As shown in FIG. 3, the illustrated example of the object classification system 300 can include a correlation module 304 in communication with the image processor 302, interior imager(s) 124, and other sensors (e.g., weight sensors 130, beam sensors 146, moisture sensors 148, etc.). The correlation module 304 is configured to provide a correlation between the sensor data 306 (e.g., data from the interior imager(s) 124 and/or image processor 302, weight sensors 130, moisture sensors 148, etc.) and the object classification data 308.

Object classification data 308 can comprise a plurality of datasets related to various objects, people, pets, and other objects that has been provided to, or learned by, the object classification system 300. As shown, the object classification data 308 can include datasets for when the vehicle is empty—e.g., nothing other than the vehicle interior in the image data, little or no weight indicated on the weight sensors 130, etc.). The object classification data 308 can also include datasets for when the vehicle is occupied by only people ("Object 1") using, for example, object classification, facial recognition software, detection of a passenger's mobile device, and/or other sensor inputs (e.g., the seat weight sensor(s) 130a). Obviously, if no objects other than passengers are present, then no reminder is necessary.

The object classification data 308 can also include several datasets for objects of varying values. In other words, if the object is something that is relatively valueless (e.g., a magazine or newspaper), for example, the object may be classified as such, "Newspaper/Magazine." In this case, the reminder level 310 can be set to "Stage 1" indicating that a reminder will be provided, but if the object is left behind, no further steps need to be taken. If the object is a wallet ("Object 7") or briefcase 134 (Object 6), on the other hand, the cargo may be classified as such and assigned a higher reminder level 310, "Stage 3." This indicates that the object is of very high intrinsic or personal value to the passenger and that additional steps are warranted. It should be noted that, though eight datasets are shown, additional datasets could be used to improve accuracy and correlation. Indeed, the number of datasets may be ever increasing as the object classification system 300 is introduced to, and "learns," new object classification data 308.

In some examples, the image processor 302 is configured to determine the object classification data 308 associated with the object based, at least in part, on the correlation between the sensor data 306 and the known object classification data 308. In some examples, the correlation between the sensor data 306 and the object classification data 308 may include at least one of a correlation table correlating the sensor data 306 and object classification data 308, or a mathematical relationship between the image data and the object classification data 308. In some examples, the correlation between the sensor data 306 and the object classification data 308 may be determined according to the above-noted image depth profile and machine learning techniques.

In the example shown in FIG. 3, the correlation module 304 includes a correlation table 312. The example correlation table 312 provides a correlation between sensor data 306 and object classification data 308 related to various types of objects that may be placed in the vehicle 102. In the example shown, the correlation table 312 also provides a correlation between the object classification data 308 and the reminder level 310.

For example, the correlation module 304 receives the sensor data 306 from the above-mentioned sensors (e.g., seat weight sensors 130, beam sensors 146, moisture sensors 148, etc.) and uses the correlation table 312 to identify the object that most closely matches known parameters for various types of object. As noted above, this correlation may be based solely on machine learning techniques, among other things. Based on the object identified, the correlation module 304 uses the correlation table 312 to identify the estimated object classification data 308, for example, and provide a reminder level 310 to the as shown in FIG. 3. In other examples, the object classification system 300 may provide an object classification to the vehicle notification system 406 and the vehicle notification system 406 may determine the reminder level 310. As above, such a classification may be performed by various computer vision algorithms, such as machine learning using a convolutional neural network.

As shown in FIG. 3, the example correlation table 312 shows sensor data 306 that relates to Empty (e.g., no objects or passengers in the vehicle 102) through Object 7 (wallet), though any number of correlations are contemplated. The example correlation table 312 also includes example object classification data 308 associated with the examples of the sensor data 306 and the example reminder levels 310 corresponding to the example sensor data 306. In this example, the correlation table 312 receives the sensor data 306 from one or more sources (e.g., the image processor 302, the seat weight sensor 130a, etc.). The example correlation table 312 can represent discrete sensor data 306 sets received from the interior sensors (e.g., interior imagers 124, weight sensors 130, beam sensors 146, moisture sensors 148) and/or image processor 302 as "Empty" information, Object 1 information, Object 2 information, through Object 7 information. In some examples, the interior sensors 124, 130, 146, 148 and other inputs (e.g., image processor 302) may be configured to capture the discrete sensor data at, for example, predetermined time intervals, or some other triggering events.

Based on the content of the sensor data 306, the correlation module 304 determines the object classification data 308 that most closely matches the sensor data 306 from a discrete data set. The correlation module 304 receives, for example, data from the image processor 302 and the seat weight sensor 130a, for example, analyzes it, and determines that the sensor data 306 for the object (e.g. sensor data 106 associated with Object 3) most closely correlates to a sweater. As a result, the correlation module 304 provides a middle reminder level 310 (e.g., "Stage 2"), which is higher than for a newspaper, for example, but lower than a briefcase 134. In other examples, the correlation module 304 receives, for example, data from the image processor 302, the moisture sensor 148, and the cup holder weight sensor 130c, for example, analyzes it, and determines that the sensor data 306 for Object 3 is almost certainly a drink. As a result, the correlation module 304 provides a reminder level 310 (e.g., "Stage 1") associated with an object of lesser value. In other words, while a passenger may be inclined to retrieve a favorite sweater from a lost and found, for example, they would almost certainly just buy another soda.

Thus, the different reminder levels 310 can be associated with different levels of communication with the passengers. If a passenger leaves a newspaper in the vehicle 102, for example, "Stage 1" may provide the passenger with a reminder as the doors open, "Don't forget your newspaper." If the object is a briefcase 134, on the other hand, "Stage 3" may provide the passenger with a reminder at a predetermined time before arriving at the destination, a reminder when the doors open, a reminder when/if the passenger leaves the object and exits the vehicle 102, and an e-mail or text message after the passenger has left the area. In some case, the vehicle 102 may also linger at the destination to provide the passenger with an opportunity to return to the vehicle 102.

The example list of object classification data 308 is not exhaustive, and merely provides several examples for the purpose of demonstration. Other objects and the corresponding data may also be included, such as, for example, children, electronics, and groceries. Further examples of reminder levels include one or more maintenance levels for object data that is associated with trash, a mess, or some other problem with the interior of the vehicle. In addition, within each of the object classification data 308 examples shown in FIG. 3, there may be further sub-categories. In addition, the example reminder levels 310 are for discussion purposes only and should not be viewed as limiting.

Figure 4:
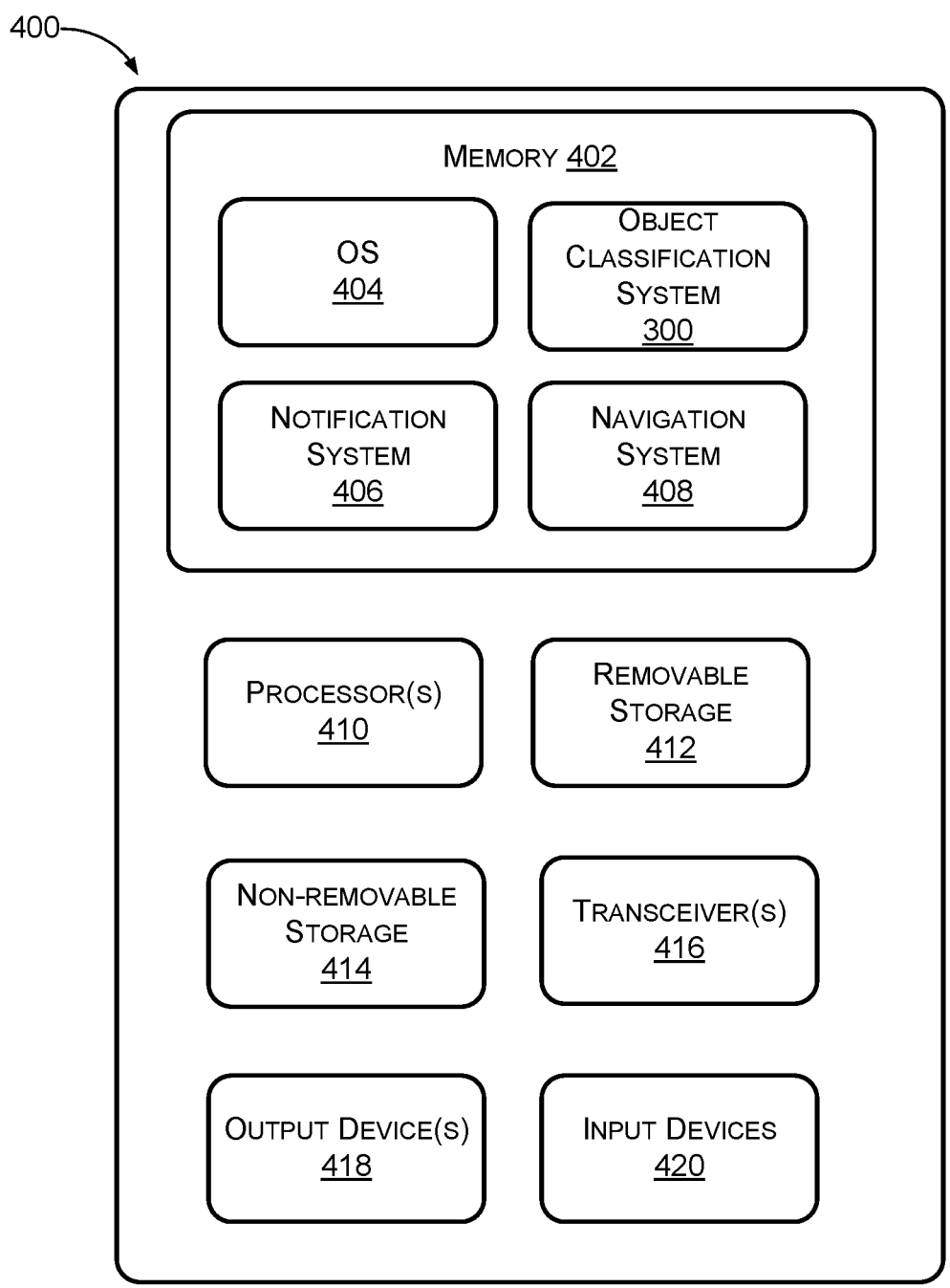
FIG. 4 is a block diagram of an electronic device, in accordance with some examples of the present disclosure.

FIG. 4 is a component level schematic view of an electronic device 400 for use with the system 100. The electronic device 400 can comprise a controller for the system 100. The electronic device 400 can comprise a dedicated electronic device, such as a dedicated microcontroller, or can be a cell phone, smart phone, laptop, tablet, or other electronic devices that comprise a number of components to gather data, communicate, and maneuver, among other things, based on the data.

The electronic device 400 can comprise memory 402 configured to include computer-executable instructions including at least an operating system (OS) 404 for receiving data and controlling the system 100, the object classification system 300, a vehicle notification system 406, and a vehicle navigation system 408, among other things. The electronic device 400 can also include one or more processors 410, removable storage 412, non-removable storage 414, transceiver(s) 416, and output device(s) 418. Of course, in some examples, rather than being located in the electronic device 400, the OS 404, object classification system 300, or other components or portions thereof, can be located on a remote server, on a passenger's electronic device (e.g., their cell phone), or in another component of the system 100 (e.g., the vehicle's ECU).

In various implementations, the memory 402 can be volatile (such as random access memory, or RAM), non-volatile (such as read only memory, or ROM, flash memory, etc.), or some combination of the two. The memory 402 can also comprise the OS 404. As discussed below, the OS 404 can receive sensor data, provide communications interfaces, and communicate with other vehicles, a central control, law enforcement, and other entities, and perform other functions related to the various vehicle 102 and system 100 functions.

The memory 402 can also store incoming vehicle data from the vehicle's sensors (e.g., interior sensors 124, 130, 146, 148). As discussed above, the incoming vehicle data can also include data from the various sensors on the vehicle 102 (e.g., global positioning system (GPS) coordinates, door sensor 150, etc.). The incoming vehicle data can enable the electronic device 400 to time reminders, escalate reminders, and take additional steps, as necessary.

In some examples, the memory 402 can also include modules including the vehicle notification system 406 and vehicle navigation system 408. The vehicle notification system 406 can receive information from the object classification system 300 and vehicle sensors (e.g., sensors 124, 130, 146, 148, 150) and/or the vehicle navigation system 408. The object classification system 300 can provide a reminder level 310, for example, related to the number and veracity of reminders for a particular object. The sensors 124, 130, 146, 148, 150 can provide information about the location of the object, for example, and/or indicate a door 116 being opened. The vehicle navigation system 408 can provide location information to the vehicle notification system 406, including, for example, when the vehicle 102 arrives at its destination.

The vehicle notification system 406 can receive location information from the vehicle navigation system 408, for example, that the vehicle 102 is a predetermined distance (e.g., 1 mile, ½ mile, two blocks, etc.) from the destination. The vehicle notification system 406 can then provide a reminder to the passenger(s). As discussed above, this may include providing a reminder message over the interior speakers 204, activating a specific light 202a (e.g., a light located above the object in question), and/or activate haptic feedback. The vehicle notification system 406 can then receive location information from the vehicle navigation system 408, for example, that the vehicle 102 is at the destination. The vehicle notification system 406 can then provide a second reminder to the passenger(s). As discussed above, in some examples, the reminder may be louder, include flashing interior lights 202, or otherwise escalate.

The vehicle notification system 406 can then receive an indication from various sensors (e.g., the exterior imager 212 or door sensor 150) on the vehicle 102, for example, that the passenger(s) are exiting the vehicle 102 at the destination. The vehicle notification system 406 can then provide a third reminder to the passenger(s). As discussed above, in some examples, the reminder may be yet louder, include flashing interior lights 202 and/or exterior lights 206, or otherwise further escalate.

In some examples, if the passenger(s) fail to retrieve the object despite the reminders, the vehicle notification system 406 can take additional steps. If the object is classified by the object classification system 300 as something relatively inexpensive and disposable (e.g., a drink or newspaper), for example, the vehicle notification system 406 may take no action and simply continue to its next pickup. In some examples, the system 100 may simply wait until a scheduled service to have the object removed.

In other examples, to provide subsequent passenger(s) with a clean vehicle 102, the vehicle notification system 406 may contact a central control or maintenance facility to schedule maintenance and/or provide a report that trash has been left in the vehicle 102. In some examples, the vehicle notification system 406 may also provide this information to the vehicle navigation system 408 to prompt the vehicle 102 to navigate to a service facility for cleaning. In other examples, the vehicle notification system 406 can receive the vehicle's current location from the vehicle navigation system 408, provide this information to a mobile service provider, and wait in a particular location (e.g., a parking space or designated area) to be serviced.

If the object is classified by the object classification system 300 as something relatively expensive (e.g., a laptop) or otherwise valuable (e.g., a purse, wallet, or cell phone), the vehicle notification system 406 may take additional steps. In some examples, the vehicle notification system 406 may use the OS 404 and/or transceiver(s) 416 to contact the passenger(s) via text message, e-mail, or voice call. The vehicle notification system 406 may send a text to the passenger(s), for example, while the vehicle 102 waits in the destination location.

If the passenger(s) return to the vehicle 102 within a reasonable amount of time (e.g., within 5 minutes), then the object can be returned quickly and relatively easily. In some examples, the identity of the passenger(s) can be verified to ensure the object is returned to the proper parties. In some examples, the cell phone, passcode, or other measure used by the passenger(s) to access the vehicle 102 for the initial journey can be used. In other examples, the vehicle notification system 406 can send a passcode, or other security measure (e.g., a 2-D or 3-D bar code, quick response (QR) code, etc.) with which the passenger(s) can access the vehicle 102.

In some examples, despite multiple reminders, the passenger(s) may simply not return to retrieve even the most valuable items. This may be because they are traveling, in an important meeting, in the hospital, or otherwise unavoidably detained. In this case, the system 100 can take additional steps to safeguard the item. In some examples, the vehicle notification system 406 can send a message to the central control and/or maintenance facility that the object remains in the car and its classification. In some examples, the vehicle notification system 406 can also send a message to the vehicle navigation system 408 to navigate to the central control or maintenance facility. The central control or maintenance facility can then retrieve the object, place it in a lost and found, for example, and send an updated e-mail or text providing the passenger(s) with the location and disposition of the object.

In other examples, such as for particularly valuable items, the vehicle notification system 406 may contact law enforcement instead or, or in addition to, the central control and/or maintenance facility. In this configuration, the vehicle notification system 406 may send a message (e.g., a text or e-mail) to local law enforcement related to the object, the passenger(s), and providing the location of the vehicle 102. Law enforcement can then access the vehicle 102 using appropriate means (e.g., a police-only passcode), take possession of the object, write a report, and/or contact the passenger(s). In some examples, the vehicle notification system 406 can send a signal to the vehicle navigation system 408 to simply navigate to the closest police station, for example, to drop off the object for safekeeping and return.

In some examples, the memory 402 can also include the vehicle navigation system 408. As the name implies, the vehicle navigation system 408 can enable the vehicle 102 to navigation from one place to another. The vehicle navigation system 408 can include, for example, one or more GPS receivers, local and global maps, an inertial measurement unit (IMU), and other sensors and data. The vehicle navigation system 408 can enable the system 100 to identify pick-up and drop-off (or, destination) locations, report the current position of the vehicle 102, and navigation between locations. As mentioned above, in some examples, the vehicle navigation system 408 can also enable the electronic device 400 to provide location information and/or navigate to central control, maintenance facility, or law enforcement locations.

In some implementations, the processor(s) 410 can comprise a central processing unit (CPU), a graphics processing unit (GPU), or both a CPU and a GPU, or any other sort of processing unit. The processor(s) 410 can be responsible for running software on the electronic device 400, including the OS 404, object classification system 300, vehicle notification system 406, and vehicle navigation system 408, among other things, and to interpret and send messages to the central server, if applicable. In some examples, the processor(s) 410 can also perform calculations and provide instructions based on data from the sensors 124, 130, 148, 150 for example.

The electronic device 400 can also include additional data storage devices (removable and/or non-removable) such as, for example, magnetic disks, optical disks, or tape. Such additional storage is illustrated in FIG. 4 by removable storage 412 and non-removable storage 414. The removable storage 412 and non-removable storage 414 can store the various modules, programs, and algorithms for the OS 404, object classification system 300, vehicle notification system 406, and vehicle navigation system 408, among other things.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the electronic device 400. Any such non-transitory computer-readable media may be part of the electronic device 400 or may be a separate device (e.g., a jump drive) or a separate database or databank (e.g. at a central server).

In some implementations, the transceiver(s) 416 can include any sort of transceivers known in the art. The transceiver(s) 416 can include, for example, wireless modem(s) to facilitate wireless connectivity with the other vehicles, a remote server (if applicable), the Internet, and/or an intranet. Further, the transceiver(s) 416 may include a radio transceiver that performs the function of transmitting and receiving radio frequency communications via an antenna (e.g., cellular, Wi-Fi, or Bluetooth®).

In some implementations, the output device(s) 418 can include any sort of output devices known in the art, such as displays (e.g., a liquid crystal display (LCD), light emitting diode (LED) display, or thin film transistor (TFT) screen), a touchscreen display, interior lights 202, exterior lights 206, interior speakers 204, exterior speakers 208, a tactile feedback mechanism 210 to provide interactive feedback to the passenger. As discussed above, in some examples, the output device(s) 418 can play various reminders to remind passengers to retrieve objects in the interior space 118 of the vehicle 102, among other things. Output device(s) 418 can also include ports for one or more peripheral devices, such as headphones, peripheral speakers, or a peripheral display to provide feedback to passengers, for example.

In various implementations, input device(s) 420 can include any sort of input devices known in the art. For example, input device(s) 420 may include the interior imagers 124, exterior imagers 212, a microphone, a keyboard/keypad/touchpad, a touch-sensitive display, a proximity sensor, gyroscope, accelerometer, altimeter, and other sensors. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input device(s) 420 can also include communication ports to receive data from external sources.

As shown in FIGS. 5A-5D, examples of the present disclosure can also include a method 500 for providing reminder messages to passengers in an automated vehicle. As discussed above, the system 100 can detect the presence of various objects (e.g., drinks, wallets, computers, etc.) and provide ever escalating reminders to passengers. The system 100 can provide an initial reminder as the vehicle 102 approaches the destination, for example, a second reminder at the destination, and a third reminder if the passenger(s) exit the vehicle 102, but leave the object behind. The level, number, or severity of reminders can be based on part on the classification of the object as particularly valuable or irreplaceable.

Figure 5A:
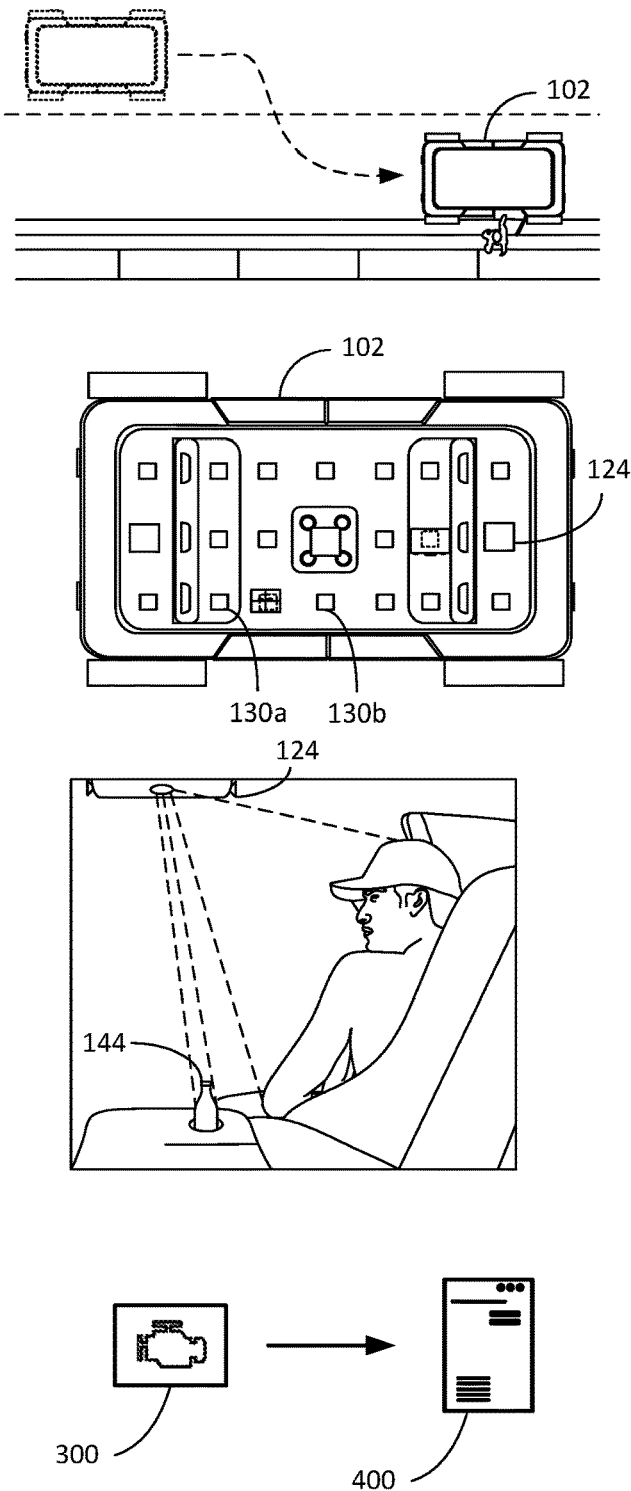
FIGS. 5A-5D are flow diagrams of an example of a method to detect objects in a vehicle and provide one or more notifications to passengers to retrieve the objects prior to and/or after leaving the vehicle, in accordance with some examples of the present disclosure.
Figure 5A:
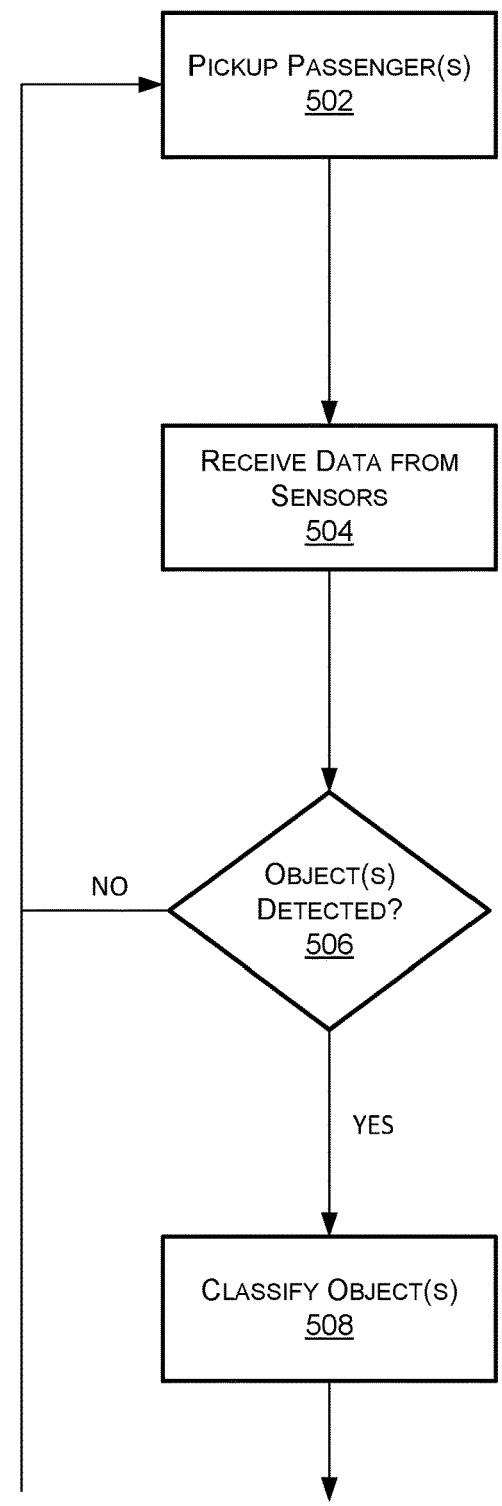

As shown in FIG. 5A at 502, therefore, the method 500 can begin by picking up passengers or cargo. As discussed above, the vehicle 102 can be a taxi, for example, and can be autonomous, semi-autonomous, or manned. The vehicle 102 can use the vehicle navigation system 408 to report to a location provided by the passenger, the passenger's cell phone, or a related application (or, "app").

At 504, the system 100 can receive data from the interior sensors (e.g., sensors 124, 130, 146, 148) related to whether there are any objects in the interior space 118 of the vehicle 102 with the passenger(s). This can include weight and location information provided by the various weight sensors 130, video from the interior imagers 124, and/or moisture levels from the moisture sensor 148, among other things. Thus, as mentioned above, the interior sensors may detect an object that is approximately rectangular in shape, weighs six pounds, and is located in the middle of one of the seats 132.

At 506, the system 100 can determine if any objects are detected. If not, the system 100 can reset until the next passenger (shown) or periodically recheck during the journey. Rechecking may be useful, for example, when a passenger retrieves their cell phone from a pocket, for example, mid-trip to check messages and then places it in the cup holder 142. Obviously, if no objects are ever detected in the vehicle 102, then there is no need for any reminders.

At 508, when object(s) are detected, on the other hand, the system 100 (e.g., the object classification system 300) can classify the object(s) to determine what, if any, actions should be taken in the future. As mentioned above, objects can be classified according to their intrinsic or personal value to the passenger. In other words, a laptop may be very expensive, while the contents of a wallet or a purse may simply be difficult, or impossible, to replace. In either case, these items are likely of significantly more value to the passenger than a soda or newspaper, for example.

Figure 5B:
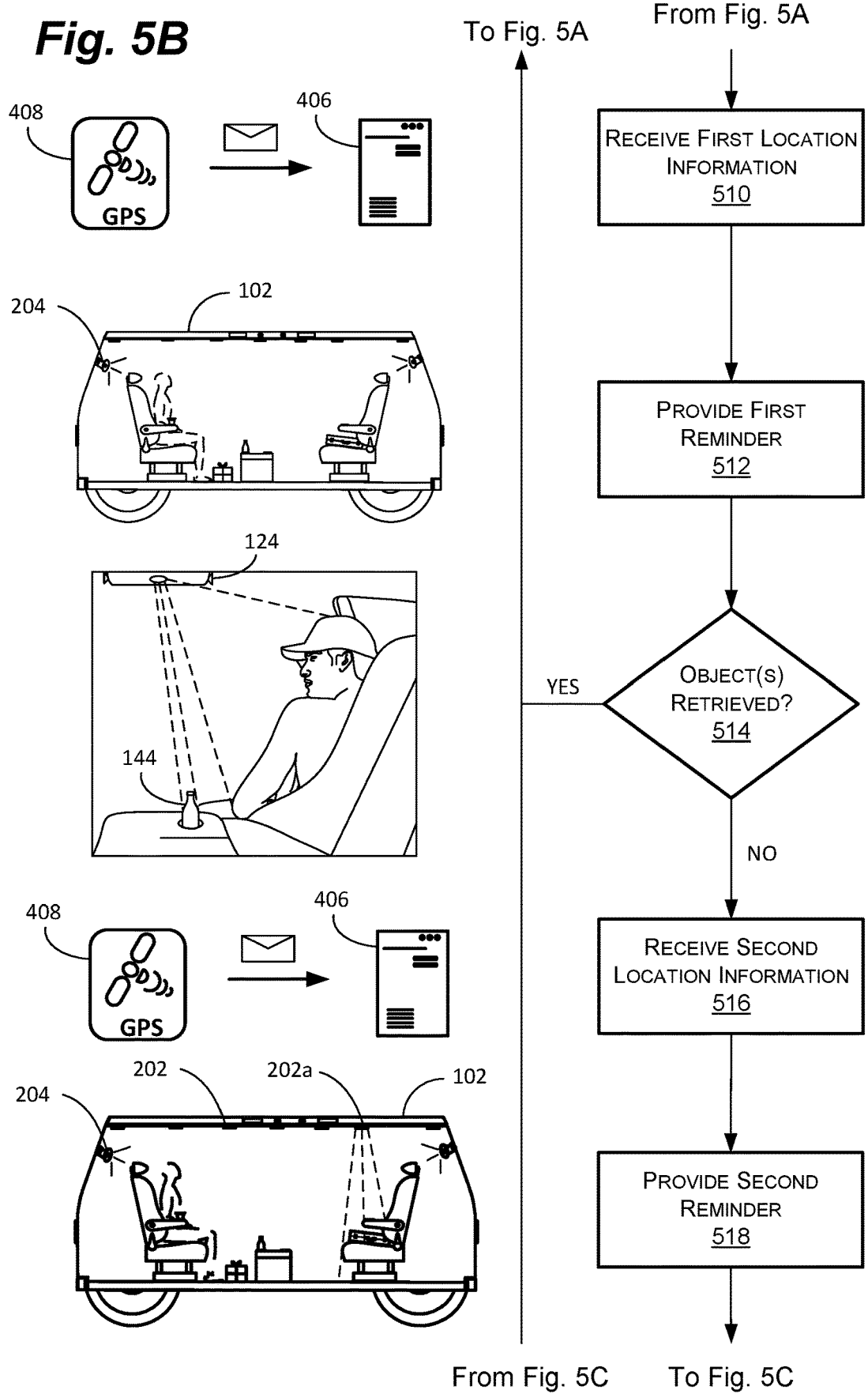

As shown in FIG. 5B, at 510, the system 100 (e.g., the vehicle notification system 406) can receive a first location (e.g., from the vehicle navigation system 408). This may include an intersection, GPS coordinates, landmark, or other information. The first location can be a predetermined distance (e.g., 1 mile), for example, or a predetermined travel time (e.g., 1 min.) from the destination. This can prompt the vehicle notification system 406 to provide a first reminder to the passenger not to forget the object.

At 512, the vehicle notification system 406 can provide the first reminder. As discussed above, the first reminder may be relatively subtle or gentle. The vehicle notification system 406 may simply provide a recorded message over the interior speakers 204, for example, "Your destination is X minutes away, please remember to retrieve your belongings." In some examples, based on the location or classification information, the vehicle notification system 406 may provide a more specific message such as, for example, "Your destination is approaching, don't forget your phone in the cup holder."

At 514, the system 100 can determine if the passenger has retrieved the object. This can be determined because the object no longer appears in the interior imager 124, for example, or because a seat weight sensor 130*a* no longer registers the weight of the object in the seat 132. The combination of the seat weight sensor 130*a* in one location going to (or near) zero coupled with the seat weight sensor 130*a* proximate the passenger going up by the same amount, for example, can indicate that the passenger has placed the object on their lap. Regardless, if the object has been retrieved by the passenger at any point prior to the destination, the system 100 can reset until the next passenger (or periodically recheck, as discussed above).

At 516, if the object has not been retrieved on the other hand—e.g., the cell phone is still in the cup holder), then the system 100 can received second location information from the vehicle navigation system 408. The second location can comprise a location closer to the destination (e.g., with ½ mile or 30 seconds) than the first location, for example, or may be the destination itself (e.g., the vehicle 102 is pulling up to the curb, but has not yet stopped). Regardless of the actual location, arriving at the second location can prompt the vehicle notification system 406 to provide a second reminder to retrieve the object.

At 518, the vehicle notification system 406 can provide the second reminder to retrieve the object. In some examples, the vehicle notification system 406 can provide the same, or a similar, reminder to the first reminder. In other examples, the vehicle notification system 406 may provide a second, more specific reminder such as, for example, "We have arrived at your destination, please retrieve your personal items." The second reminder may provide additional information based on the location provided by the sensors (e.g., sensors 124, 130, 146, 148) and/or the object classification system 300 such as, "Please retrieve your briefcase from the opposite seat."

In other examples, the second reminder can in some way escalate from the first message to gain the passenger's attention. So, for example, in addition to an audio message, the system 100 may also flash the interior lights 202, or a specific light 202*a* that illuminates the object. In some examples, the audio message may become louder or more forceful. In other examples, the system 100 may also provide haptic feedback by vibrating the seat 132 or arm rest, for example.

Figure 5C:
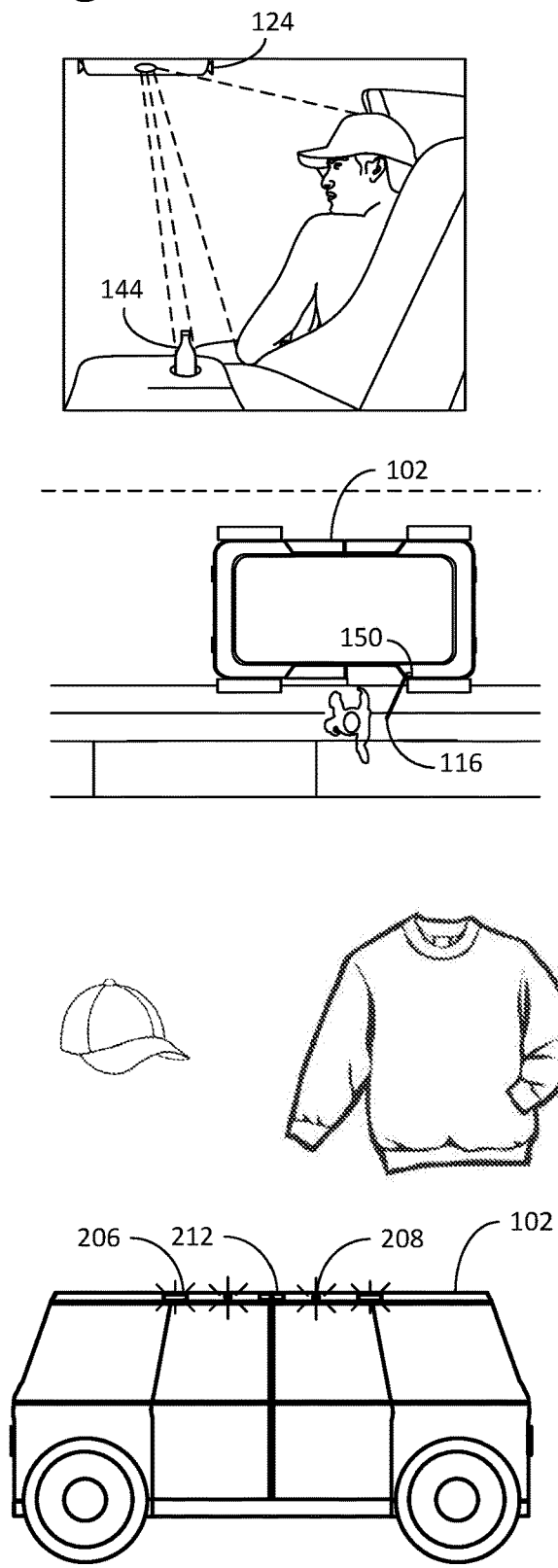
Figure 5C:
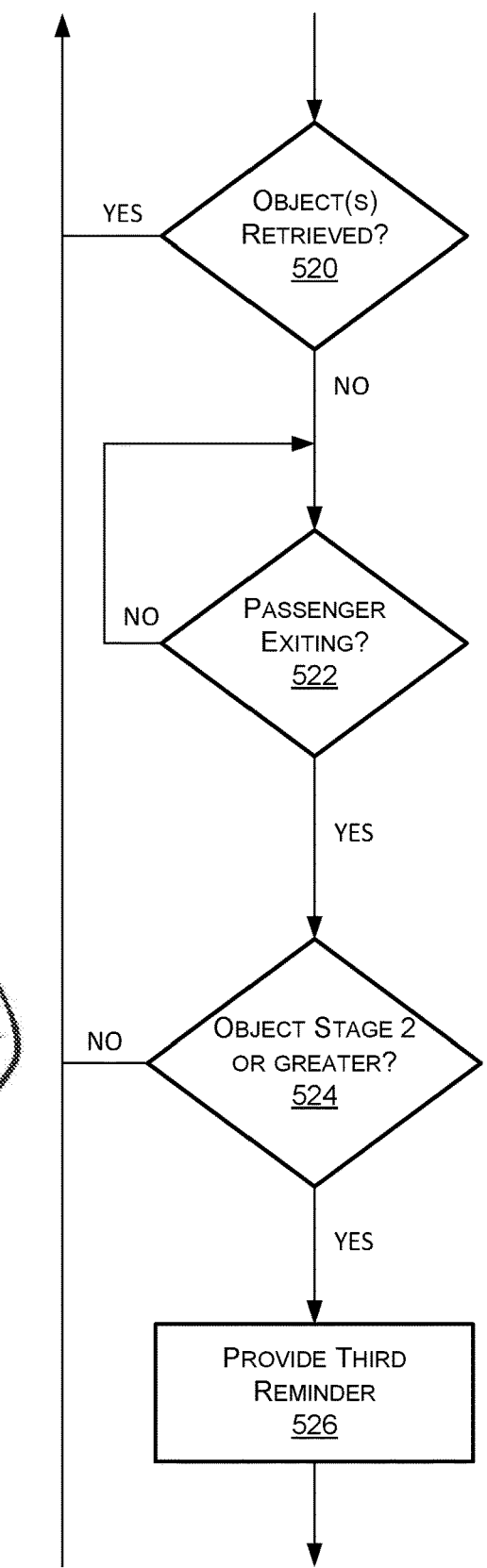

As shown in FIG. 5C at 520 the system 100 can once again determine if the passenger has retrieved the object. As previously discussed, this can be determined because the object no longer appears in the interior imager 124, for example, or because a seat weight sensor 130*a* no longer registers the weight of the object in the seat 132. If the object has been retrieved by the passenger at this point, the system 100 can reset until the next passenger because the passenger will be leaving the vehicle 102 imminently. Of course, in some examples, the system 100 may perform a final check as the passenger exits the vehicle 102.

At 522, if the object is determined to still be in the vehicle 102, the system 100 can determine if the passenger is exiting the vehicle 102. The system 100 may determine whether the passenger is still in the vehicle 102 using the interior imager 124, for example, one or more seat weight sensors 130*a* and/or a door sensor 150 (e.g., the sensor that indicates whether the door is open or closed). Thus, if no passenger appears in the interior imager 124 and/or no seat weight sensor 130*a* or floor weight sensor 130*b* exceeds 70 pounds, for example, then the passenger has likely left the vehicle 102.

Determining whether the passenger is leaving the vehicle 102 can be used to determine if additional action is needed. In other words, if the vehicle 102 is at the destination, but the passenger is on a phone call, the system 100 may simply wait until the passenger exits the vehicle 102 to take additional actions. The passenger may finish their call, for example, retrieve the briefcase 134, and then exit the vehicle 102 obviating the need for another reminder.

At 524, if, on the other hand, the passenger is exiting the vehicle (e.g., door sensor 150 "open", weight sensors—zero), but has left the object behind, the system 100 (or, the object classification system 300) can determine if the classification of the object warrants additional action. If the object is a drink or newspaper (Stage 1), for example, the system 100 may simply reset under the assumption that the passenger either intended to leave the object behind (i.e., the object is trash) or that it is simply not valuable enough for additional action.

In some examples, the system 100 can simply reset for the next passenger. If the object is a newspaper or magazine, for example, the next passenger may actually enjoy having something to read. In other examples, the system 100 may contact a central control or maintenance facility to be cleaned.

At 526, if, on the other hand, the object is classified such that additional action is warranted (in this case, Stage 2 or higher) the vehicle notification system 406 can provide a third reminder. In some examples, the vehicle notification system 406 can provide the same, or a similar, reminder to the first and second reminders. In other examples, the vehicle notification system 406 may provide a third, more specific reminder such as, for example, "You have left your personal items in the vehicle!" The third reminder may also provide additional information based on the location provided by the sensors (e.g., sensors 124, 130, 146, 148) and/or the object classification system 300 such as, "You have left your briefcase in the seat!"

In other examples, the third reminder can further escalate from the first and second messages to gain the passenger's attention before they walk away from the vehicle 102. So, for example, in addition to an audio message, the system 100 may also flash the interior lights 202, or a specific light 202*a* that illuminates the object in the interior space 118 and illuminate or flash the exterior lights 206 at the same time. In some examples, the audio message may become louder or more forceful and may be provided over both the interior speakers 204 and the exterior speakers 208. In some examples, the system 100 may flash some, or all, of the interior lights 202 and/or exterior lights 206 and output a siren, buzzer, or other attention getting sound over some, or all, of the interior speakers 204 and/or exterior speakers 208.

Figure 5D:
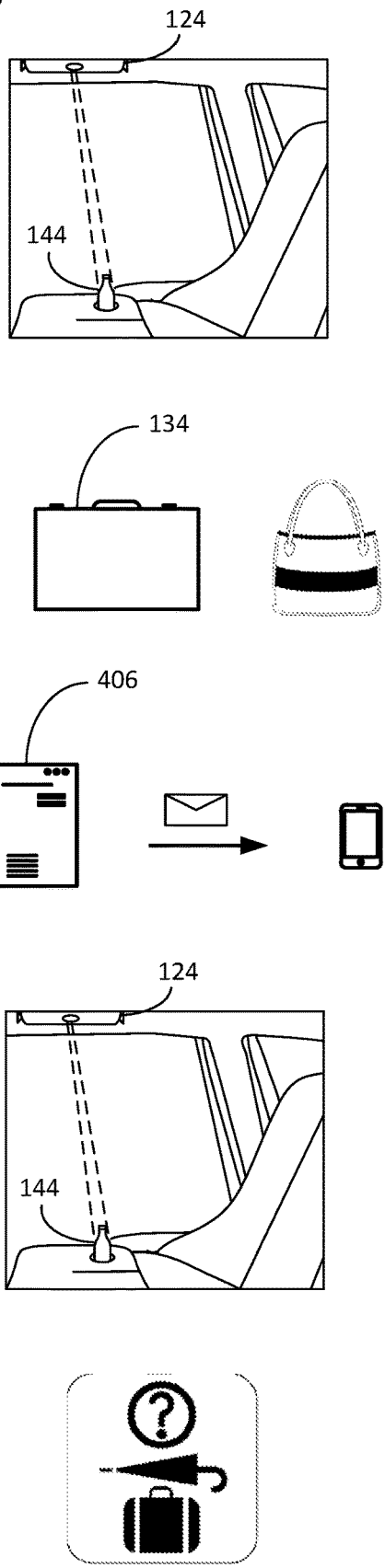
Figure 5D:
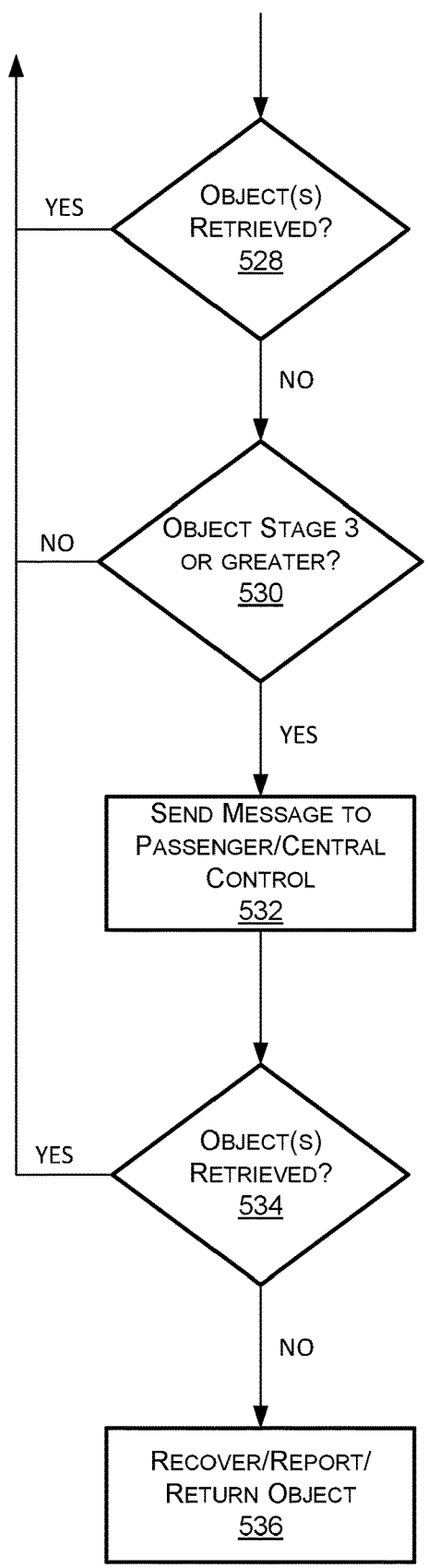

As shown in FIG. 5D, at 528, the system 100 can again check to see if the object has been retrieved. As shown, in this case, because the passenger has already exited the vehicle 102, the system 100 may simply determine if anything is in the vehicle 102. In other examples, the system 100 can still rely on the previous sensor data (e.g., a seat weight sensor 130a measuring weight in one of the seats 132). Of course, weight measured by any of the weight sensors 130 or data from any of the other sensors not consistent with the empty interior space 118 of the vehicle 102 can indicate that an object has been left behind. If the object has been retrieved, the system 100 can simply reset for the next passenger.

At 530, if, on the other hand, the object still has not been retrieved, the system 100 can determine if additional action is warranted based on the classification of the object. If not, in some cases, the system 100 can reset for the next passenger, return to a maintenance facility for cleaning, or take some other action.

At 532, if the object's classification warrants additional action (e.g., Stage 3, in this example), the vehicle notification system 406 can send a message to the passenger or central control, for example. If the object is a laptop, for example, the vehicle notification system 406 may send an e-mail or text the passenger's cellphone, for example, and then loiter at the destination. If the passenger is still in the area, for example, this may enable the passenger to return to the vehicle 102 to retrieve the object. In those circumstances where the vehicle cannot loiter, the vehicle may provide the passenger with the opportunity to recall the vehicle if it is within some predetermined distance from the passenger.

In some examples, booking the vehicle 102 can be done through an online or cellphone based app. In this manner, for security, the system 100 can use the same authentication method used to book and access the vehicle 102 initially to ensure the object is returned to the same passenger. In other words, when booking the vehicle 102 initially, the passenger may use an internet-based app, receive a passcode or other security measure, and access the vehicle 102 with an access code, barcode, or other means. In this configuration, the system 100 can use the same, or a similar, passcode to ensure the correct passenger retrieves the object. This can prevent bystanders that may have heard a reminder over the exterior speakers 208, for example, from accessing the vehicle 102 and stealing the object.

In other examples, the vehicle notification system 406 may send a message to a central control, security, lost and found, or other service associated with the operation of the vehicle 102. In some examples, passengers may create online profiles, including names, addresses, and contact and payment information used to book vehicles 102. In this configuration, an operator at the central control can receive the message from the system 100 that an object has been left behind, access the passenger's profile for contact information, and then call, e-mail, or text the passenger.

At 534, regardless of the method used to contact the passenger, the system can once again check to see if the object has been retrieved. In some examples, the vehicle 102 may loiter for a predetermined amount of time (e.g., 5 or 10 minutes) and periodically check to see if the object has been retrieved. If so, the system 100 can reset for the next passenger and continue.

At 536, if the object has still not been retrieved the system 100 may take additional actions based on the classification of the object. If, for example, the object is basically trash (Stage 1), the system 100 may do nothing, for example, or may report to a service facility for cleaning. If the object is a personal item, such as a sweater or jacket (Stage 2), for example, the system 100 may report the object to lost and found and/or the vehicle navigation system 408 may navigate the vehicle 102 to a central control or lost and found facility. If the item is particularly valuable, such as a laptop, or is in some way suspicious, for example, the vehicle notification system 406 may report the object to the central control for review by a teleoperation operator or to local law enforcement, as appropriate.

FIGS. 5A-5D are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

While several possible examples are disclosed above, examples of the present disclosure are not so limited. For instance, while systems and methods for providing passengers with various reminders in autonomous vehicles are discussed, for example, the system could also be used in semi-autonomous or manually operated vehicles without departing from the spirit of the disclosure. In addition, the location and configuration used for various features of examples of the present disclosure such as, for example, the order of steps, the components of the system 100 or electronic device 400, and the locations of various components (e.g., the interior imagers 124, and exterior imagers 212 and interior lights 202, and exterior lights 206) can be varied according to a particular vehicle 102, vehicle layout, or other component that requires a slight variation due to, for example, the size or construction of the vehicle 102 or passenger area 120, the operating area of the vehicle 102, or the processing power of the electronic device 400. Such changes are intended to be embraced within the scope of this disclosure.

The specific configurations and layouts of the system 100, vehicle 102, electronic device 400, and other features, and the size, location, and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of protection afforded by this application is indicated by the appended claims, rather than the foregoing description, and all variations that come within the meaning and range of equivalents thereof are intended to be embraced therein.

What is claimed is:

1. A system comprising:
one or more processors;
a sensor disposed in an internal portion of the system and configured to generate sensor data; and
one or more non-transitory computer readable media having instructions stored therein which, when executed by the one or more processors, cause the system to:
receive the sensor data from the sensor;
input at least a portion of the sensor data into a machine learned model;

receive, from the machine learned model, an object classification of an object located in the internal portion of the system;
determine an event associated with the system, wherein the event comprises one or more of:
the system reaching a predetermined distance from a destination; or
the system reaching a predetermined travel time from the destination;
determine, based at least in part on the object classification of the object, a reminder level to a user to remove the object from the system from a plurality of reminder levels; and
provide, based at least in part on the event, the object classification and the reminder level, a reminder comprising one or more of an audio alert or a visual alert to the user to remove the object from the system.

2. The system of claim 1, wherein the system is a vehicle, and wherein the sensor is disposed in the internal portion of the vehicle.

3. The system of claim 1, wherein the sensor comprises one or more of:
a camera;
a weight sensor;
a pressure sensor;
a light beam;
a moisture sensor; or
a vision system.

4. The system of claim 1, wherein the object classification comprises a personal object.

5. The system of claim 1, wherein the object comprises a first object and the object classification comprises a first object classification and the reminder level is a first reminder level, and
wherein the instructions, when executed by the one or more processors, further cause the system to:
receive, from the machine learned model, a second object classification of a second object located in the internal portion of the system, the second object classification differing from the first object classification; and
determine, based at least in part on the second object classification, a second reminder level associated with the second object, the second reminder level differing from the first reminder level,
wherein the first and second reminder levels are indicative of one or more of a number of times to repeat the reminder or a set of events to associate with the reminder.

6. The system of claim 1, wherein the object classification received from the machine learned model further identifies an estimated monetary value of the object and the event is a first event, the instructions further causing the one or more processors to escalate the audio alert or the visual alert based at least in part on one or more of:
determining that the estimated monetary value of the object is above a threshold; or
based upon an occurrence of a second event.

7. The system of claim 1, wherein the object is an inanimate object and the object classification is an inanimate object classification.

8. A method comprising:
receiving sensor data from a sensor in an internal compartment of a system;
inputting at least a portion of the sensor data into a machine learned model;
receiving, from the machine learned model, an object classification of an object located in the internal compartment of the system;
determining an event associated with the system, wherein the event comprises one or more of:
the system reaching a predetermined distance from a destination; or
the system reaching a predetermined travel time from the destination;
determining, based at least in part on the object classification of the object, a reminder level to a user to remove the object from the system from a plurality of reminder levels; and
providing, based at least in part on the event, the object classification, and the reminder level, a reminder comprising one or more of an audio alert or a visual alert to the user to remove the object from the system.

9. The method of claim 8, wherein the system is a vehicle, and where in the sensor is disposed in the internal compartment of the vehicle.

10. The method of claim 8, wherein the sensor comprises one or more of:
a camera;
a weight sensor;
a pressure sensor;
a light beam;
a moisture sensor; or
a vision system.

11. The method of claim 8, wherein the object classification comprises a personal object.

12. The method of claim 8, wherein the object comprises a first object and the object classification comprises a first object classification and the reminder level comprises a first reminder level, the method further comprising:
receiving, from the machine learned model, a second object classification of a second object located in the internal compartment of the system, the second object classification differing from the first object classification; and
determining, based at least in part on the second object classification, a second reminder level associated with the second object, the second reminder level differing from the first reminder level,
wherein the first and second reminder levels are indicative of one or more of a number of times to repeat the reminder or a set of events to associate with the reminder.

13. The method of claim 8, wherein the object classification received from the machine learned model further identifies an estimated monetary value of the object and the event is a first event, the method further comprising escalating the audio alert or the visual alert based at least in part on one or more of:
determining that the estimated monetary value of the object is above a threshold; or
based upon an occurrence of a second event.

14. The method of claim 8, wherein the object is an inanimate object and the object classification is an inanimate object classification.

15. A system comprising:
one or more processors; and
one or more non-transitory computer readable media having instructions stored therein which, when executed by the one or more processors, cause the one or more processors to:
receive sensor data from a sensor in an internal compartment of a vehicle;

determine, using a machine learned model and based at least in part on the sensor data, an object classification of an object located in the internal compartment of the vehicle;

determine an event associated with the vehicle, wherein the event comprises one or more of:
 the vehicle reaching a predetermined distance from a destination; or
 the vehicle reaching a predetermined travel time from the destination;

determine, based at least in part on the object classification of the object, a reminder level to a user to remove the object from the system from a plurality of reminder levels; and provide, based at least in part on the event, the object classification, and the reminder level, a reminder comprising one or more of an audio alert or a visual alert to the user to remove the object from the vehicle.

16. The system of claim 15, wherein the sensor comprises one or more of:
 a camera;
 a weight sensor;
 a pressure sensor;
 a light beam;
 a moisture sensor; or
 a vision system.

17. The system of claim 15, wherein determining the object classification comprises determining that the object is a personal object or that the object is trash.

18. The system of claim 15, wherein the machine learned model further identifies, based at least in part on the sensor data, an estimated monetary value of the object and the event is a first event, the instructions further causing the one or more processors to escalate the audio alert or the visual alert based at least in part on one or more of:
 determining that the estimated monetary value of the object is above a threshold; or
 based upon an occurrence of a second event.

19. The system of claim 15, wherein providing the one or more of the audio alert or the visual alert comprises transmitting the one or more of the audio alert or the visual alert to a mobile device of the user.

20. The system of claim 15, wherein the object is an inanimate object and the object classification is an inanimate object classification.

* * * * *